United States Patent
Kolli et al.

(10) Patent No.: US 8,451,833 B2
(45) Date of Patent: May 28, 2013

(54) SYSTEM AND METHOD FOR TRANSPARENT VIRTUAL ROUTING

(75) Inventors: Raja Kolli, Irvine, TX (US); Garrett Mead, Las Vegas, NV (US); John Reister, Palo Alto, CA (US); Christopher J. Shaver, San Diego, CA (US); Wendell Sun, San Diego, CA (US); Mark Tiedeman, Poway, CA (US)

(73) Assignee: Motorola Mobility LLC, Libertyville, IL (US)

( * ) Notice: Subject to any disclaimer, the term of this patent is extended or adjusted under 35 U.S.C. 154(b) by 949 days.

(21) Appl. No.: 11/956,652

(22) Filed: Dec. 14, 2007

(65) Prior Publication Data

US 2008/0151906 A1 Jun. 26, 2008

Related U.S. Application Data

(62) Division of application No. 10/846,992, filed on May 14, 2004, now abandoned.

(51) Int. Cl.
*H04L 12/28* (2006.01)

(52) U.S. Cl.
USPC .......................................... 370/389; 709/220

(58) Field of Classification Search
USPC ..................... 370/270, 389, 292, 390, 395.64, 370/397, 465, 466, 473, 432, 404; 379/27.01; 709/220, 221; 725/106, 114, 138, 118
See application file for complete search history.

(56) References Cited

U.S. PATENT DOCUMENTS

| | | | |
|---|---|---|---|
| 6,570,875 B1 | 5/2003 | Hegde | |
| 6,625,659 B1 | 9/2003 | Aramizu et al. | |
| 7,012,922 B1 | 3/2006 | Unitt et al. | |
| 7,016,353 B2* | 3/2006 | Proctor et al. | 370/392 |
| 7,293,077 B1 | 11/2007 | Teo et al. | |
| 2001/0028644 A1 | 10/2001 | Barzegar et al. | |
| 2002/0041657 A1 | 4/2002 | Ulanskas et al. | |
| 2003/0081614 A1 | 5/2003 | Sukegawa et al. | |
| 2003/0208602 A1* | 11/2003 | Bhalla et al. | 709/227 |
| 2004/0114578 A1 | 6/2004 | Soncodi et al. | |
| 2004/0165592 A1 | 8/2004 | Chen et al. | |
| 2005/0083440 A1 | 4/2005 | Kang | |
| 2005/0120149 A1 | 6/2005 | Skarpness | |
| 2006/0035633 A1 | 2/2006 | Harris et al. | |
| 2006/0126659 A1* | 6/2006 | Baum et al. | 370/466 |

OTHER PUBLICATIONS

Office Action, U.S. Appl. No. 11/956,640, Aug. 10, 2010.
Office Action, U.S. Appl. No. 11/956,640, Sep. 17, 2009.
Office Action, U.S. Appl. No. 10/846,992, Sep. 30, 2008.
Office Action, U.S. Appl. No. 10/846,992, Feb. 21, 2008.

* cited by examiner

*Primary Examiner* — Mark Rinehart
*Assistant Examiner* — Matthew Hopkins

(57) ABSTRACT

A transparent routing device disposed within an access network configured in accordance with one or more lower-layer protocols is disclosed herein. The device includes a set of subscriber-side ports. Each of the subscriber-side ports is associated with a plurality of virtual subscriber-side interfaces disposed to effectively terminate a corresponding plurality of subscriber-side connections with subscriber host devices served by the access network. The device further includes at least one network-side port through which communication occurs with an external network in accordance with a higher-layer protocol. A routing table is configured to establish a correspondence between network addresses of the subscriber host devices and the plurality of virtual subscriber-side interfaces. During operation of the device, packets received through the at least one network-side port are forwarded to corresponding ones of the virtual subscriber-side interfaces based upon network addresses of the packets.

9 Claims, 14 Drawing Sheets

FIG. 3 -PRIOR ART-

SYSTEM AND METHOD FOR TRANSPARENT VIRTUAL ROUTING

CROSS-REFERENCE TO RELATED APPLICATIONS

This application is a divisional application of U.S. patent application Ser. No. 10/846,992, filed May 14, 2004 now abandoned. This application also claims priority under 35 U.S.C. §119(e) to U.S. provisional application Ser. No. 60/471,271, entitled SYSTEM AND METHOD FOR TRANSPARENT VIRTUAL ROUTING, filed May 16, 2003.

FIELD OF THE INVENTION

The present invention relates generally to high-speed broadband access networks supporting digital packet-based transport protocols, such as Digital Subscriber Loop (DSL) technology, and more specifically to a system and method for the transparent virtual routing of relatively higher-layer traffic, such as Internet Protocol (IP) traffic, through such access networks.

BACKGROUND OF THE INVENTION

Increased use of the Internet has continued to provide an impetus for higher communication rates. In the corporate realm, the need for high-speed access or data rates is often met by dedicated high-speed links (perhaps T1/E1 or T3/E3 frame relay circuits or dedicated lines) between a company and its Internet service provider (ISP). Users in the company typically utilize a local area network (LAN) to gain access to Internet routing infrastructure connected to the high-speed link. Unfortunately, residential users of the Internet are often not connected to such high-speed links, and frequently rely on standard analog or plain old telephone service (POTS) lines for access to the Internet.

The need to provide high-speed Internet access to residential consumer users is ever increasing due to the availability of information, entertainment, and the like through the world-wide web (WWW) portion of the Internet. For example, designers of web technology are constantly developing new ways to provide sensory experiences, including audio and video, to users of the WWW. As a consequence, higher-speed modems will be required to enable residential users to satisfactorily interact with the content and technologies being developed for the WWW. Unfortunately, analog or POTS line modems are limited by technical reasons to a maximum downstream data rate of 56 kilobits per second (Kbps). These conventional analog modems transmit and receive information on POTS subscriber lines through the public switched telephone network (PSTN). The Internet service provider is also coupled to the PSTN and transmits and receives information through it to the subscriber line.

A variety of communication technologies are competing to provide high-speed access to residential users. For example, DSL, cable modem, satellite broadcast, wireless LAN, and fiber technologies have all been suggested. Of these approaches, only DSL technology can utilize existing POTS subscriber lines between residential users and the telephone company central offices or local exchanges.

DSL technology provides a physical layer protocol for communicating information across a POTS subscriber line at data rates far exceeding those achievable using conventional analog modem technology and other physical layer protocols. One form of DSL is asymmetric digital subscriber line (ADSL) communication. ADSL communication involves transmitting data in one direction (typically downstream, or towards the customer premises) at a greater data rate than data is transmitted in the other direction (typically upstream, or towards the local exchange). There are also other known forms of DSL such as symmetric DSL (SDSL), high-speed DSL (HDSL) and very high-speed DSL (VDSL). These various forms of DSL are referred to generally herein as xDSL.

xDSL communication systems are generally implemented using a digital subscriber loop access multiplexer (DSLAM) located at a central office or other subscriber loop termination point of the PSTN. A DSLAM typically contains a number of xDSL termination units, or modems, that can establish an xDSL link and communicate xDSL protocol data across POTS subscriber lines. The xDSL termination units can be connected to the POTS subscriber lines via splitter devices that separate the xDSL data traffic from voice traffic on the telephone lines. Because an xDSL modem operates at frequencies higher than the voice-band frequencies, use of a splitter enables an xDSL modem to operate simultaneously with a voice-band modem or a telephone conversation over the same subscriber line. A splitter is similarly used at the customer premises to separate voice and xDSL data traffic and to provide the xDSL data traffic to an xDSL termination unit located at the remote customer premises. Once established, the xDSL link allows high-speed data communication to occur between the local exchange and the "customer premises equipment" (CPE) located at a remote customer site in the communication system.

The CPE typically includes an xDSL interface component that has an xDSL termination unit for terminating the xDSL link, as well as a buffer or other interface component between the xDSL termination unit and other CPE components. The xDSL interface may be implemented, for example, in the form of a network interface card (NIC) that interfaces between the xDSL link and a bus on a personal computer, workstation or other computing device. The xDSL interface can also form a component of a network router or bridge, such as an Ethernet or Universal Serial Bus (USB) router or bridge.

The xDSL physical layer may support various types of higher-layer user traffic, often concurrently. For example, user traffic may be carried in an asynchronous transfer mode (ATM) in which ATM cells carry user traffic. The xDSL physical layer may also support the transport of user traffic in a frame relay mode. In the frame relay mode user traffic is carried using frames formatted in accordance with the high-level data link control (HDLC) or other frame-based standard. User traffic may also be transported over the xDSL physical layer by being encapsulated within an Ethernet packet, which in turn may be carried within ATM cells or HDLC frame relay packets or some other packet delineation function which maps the bits of the packet to the physical xDSL bitstream. Additionally, many large consumer DSL service providers further encapsulate user traffic within Point to Point Protocol (PPP) packets, primarily for the purpose of limiting access to the network to only their paying customers. User traffic may be contained in packets formatted consistently with even higher network protocol layers, such as IP packets. As is known, IP packets may be routed through the Internet or a private IP network. For purposes of the following discussion, IP packets may be considered to encompass both Transmission Control Protocol IP packets (TCP/IP) and User Datagram Protocol IP packets (UDP/IP).

Turning now to FIG. 1, a block diagram is provided of an exemplary telecommunications system 10 containing a DSL-based access network 11. As shown, a plurality of subscriber locations 12 are connected to a network access provider (NAP) 14 over a corresponding plurality of xDSL links 16. The NAP 14, via a wide area network (WAN) 18 (or metropolitan area network (MAN)) which may or may not be owned by the NAP 14, is in communication with one or more Internet service providers (ISP(s)) 20 capable of handling voice and/or data traffic. The WAN 18 may be implemented as, for example, an ATM network, a frame relay network, an Ethernet network, or a native Internet Protocol (IP) network. In the cases where the WAN 18 consists of a non-native IP network, IP packets are transported over the applicable lower-layer networking technology (e.g., ATM, frame relay, Ethernet, or other networking technology).

NAP 14 represents an entity that (i) terminates xDSL link 16 at a central office or other subscriber loop termination point, and (ii) provides access to higher-level voice and data services offered by the ISP(s) 20. It should be understood that NAP 14 and the ISP(s) may or may not be affiliated or under common control. For example, a regional Bell operating company (RBOC) could provide both xDSL service and data-based Internet access, in which case it would maintain the role of both NAP 14 and ISP 20. Alternatively, in what is commonly called a "wholesale" DSL service arrangement, the NAP 14 and the ISP(s) 20 are completely separate commercial entities; the NAP 14 provides wholesale access to xDSL subscribers in return for a fee paid to it by the ISP(s) 20, and the ISP(s) 20 sell the retail Internet access service to the xDSL subscribers and collect money from them.

In operation, the NAP 14 receives packets and/or cells of voice and data information from the xDSL links 16. The NAP 14 forwards information from the received packets and/or cells to the WAN 18, which delivers such information as appropriate to the ISP(s) 20. It should be clear that information transfer occurs in the reverse direction from the ISP(s) 20 via the WAN 18 and the NAP 14. In this way the system 10 transports packets and/or cells of voice and data information between the subscriber locations 12 and the ISP(s) 20.

Each subscriber location 12 includes customer premises equipment (not shown) capable of effecting voice and/or data communication over its xDSL link 16. For example, such equipment may comprise an xDSL interface for transferring packets and/or cells of voice information to and from one or more voice-based communication instruments (e.g., telephones), and/or for providing packets and/or cells of data to a data subsystem (e.g., a personal computer, computer workstation or other computing device).

FIG. 2 illustratively represents an exemplary configuration of equipment utilized by the NAP 14. As shown, the NAP 14 utilizes one or more DSLAMs 26 located at a central office 28 or at an outside plant location or other facility positioned near enough subscriber locations 12 to enable xDSL transmission to be effected over xDSL links 16. Each DSLAM 26 is designed to support high-bandwidth applications over existing subscriber lines (i.e., the xDSL links 16). In operation, each DSLAM 26 performs adaptation between the xDSL links 16 and the WAN 18. In the downstream direction (i.e., towards the subscriber locations 12), each DSLAM 26 may perform switching and demultiplexing of packetized user information and/or ATM cells received from the WAN 18 over high-speed line 30. In the upstream direction (i.e., towards the WAN 18), each DSLAM 26 may perform multiplexing and concentration of packetized user information and/or ATM cells received over the xDSL links 16 for transmission on high-speed line 30.

In a very common implementation, such as that used by U.S. RBOC's for their consumer DSL services, the DSL-based access network 11 is configured to provide ATM cell transport from the subscriber locations 12 to the ISP(s) 20. In this regard the transported ATM cells serve as the layer-2 network protocol for establishing switched connectivity between these network nodes. Information formatted in accordance with higher level network protocols, such as Ethernet, PPP and TCP/IP packets, is encapsulated within the ATM cells and is communicated via ATM-based "virtual circuits". In particular, each subscriber location 12 may be permanently assigned a virtual circuit extending from CPE (not shown) therein to an ATM switch or gateway router within the WAN 18. This logical circuit is defined at the layer-2 protocol level.

A major drawback of this type of Layer 2 ATM-based virtual circuit switching architecture is that it results in a proliferation of virtual circuits in the access network 11, since there exists at least one ATM virtual circuit for each DSL circuit. In fact, ATM was originally designed to support networks having substantially fewer endpoints and virtual circuits than existing DSL broadband networks. Since each virtual circuit is required to be scheduled and shaped in order to maintain a desired quality of service (QoS), scalability becomes difficult and expensive, both in provisioning and management as well as in equipment capacity. In this regard it is not unusual for ATM switches and ports on such switches to reach virtual circuit capacity long before reaching cell-forwarding capacity. Moreover, providing differentiated QoS in an ATM-based context requires that different services be furnished over different virtual circuits. This renders it rather expensive to scale a broadband network based upon this architecture, since it requires a different virtual circuit to be provided for each specific service desired by each individual subscriber. Finally, all data traffic entering a virtual circuit does not, by definition, emerge until it reaches the other end of the virtual circuit. That is, all traffic entering a virtual circuit is required to traverse the entire virtual circuit, irrespective of the ultimate destination of such traffic. This disadvantageously constrains the usage of IP and other higher-layer networking schemes within the access network, which may result in inefficient bandwidth usage and traffic patterns.

To overcome these drawbacks, it is desirable to introduce higher-layer network functionality, in particular IP networking, routing and QoS functionality, into these access networks. However, attempts to introduce and manage IP routing within access networks face a number of other challenges. For example, it is anticipated that direct use of IP addressing techniques within existing access network configurations would be rather inefficient. As is known, IP routing involves the forwarding of IP packets between different IP subnets. When using IP routing in a conventional access network, relatively large IP subnets are allocated to each central office facility. Subscriber addresses are then assigned from these subnets typically by dividing the larger IP subnet into smaller IP subnets, one for each subscriber. However, the addresses within each subnet must be allocated in blocks whose sizes must be powers of two, and every subnet requires reservation of two addresses (i.e., a subnet address and a directed broadcast address). This poses particular problems for small subscribers requiring public IP addresses, since it has become increasingly difficult to obtain new public IP addresses from the remaining public address pool. For example, if a given subscriber needs two IP addresses, a "/30 subnet" containing four IP addresses must be allocated because two of the four addresses are consumed by the full subnet and directed broadcast addresses. The term "/30 subnet" indicates that 30 of the 32 bits included within the IP address field are used to identify the subnet, with the remaining 2 bits being used in defining the 4 IP addresses of the subnet. If a subscriber simply needs 3 IP addresses, a /29 subnet consisting of eight IP addresses must be allocated. This inefficiently wastes three IP addresses, as well as the two addresses consumed by the full subnet and directed broadcast addresses.

FIG. 3 illustrates an access network in which an IP subnet has been established between the central office facility (CO) of a NAP and an Internet Service Provider (ISP). Specifically, in the case of FIG. 3 the 4-address subnet 192.168.5.0/30 resides between an IP router affiliated with the ISP and the CO. The network communication equipment within the CO uses 192.168.5.2 on its WAN interface, which causes the IP router to forward packet traffic to that WAN interface using 192.168.5.1. Within the CO, subscriber IP addresses are assigned out of two subnets, i.e., 192.168.0.1/24 and 192.168.1.1/24, each of which contain 256 IP addresses. These large subnets are then further subdivided among the subscriber interfaces. It is then necessary to have routes configured in both the ISP's IP router and the NAP's CO equipment in order to route traffic between the subscribers and the network. Such a configuration disadvantageously requires coordination between the ISP and the NAP, which are generally unrelated entities.

The arrangement of FIG. 3 also requires IP addresses to either be statically provisioned into the NAP's IP devices, or dynamic routing protocols (which are often troublesome to administer and troubleshoot) must be employed to share route tables. Either way, coordination between the NAP and the ISP is again required. Finally, as the network of FIG. 3 grows, additional IP addresses must be assigned. If the IP addresses of one of the two assigned 256-address subnets become exhausted, then either that subnet needs to be expanded to a larger one, or a new, possibly larger subnet assigned. It is observed that IP addresses remaining in the other subnet cannot be assigned or used in another part of the network (e.g., in another CO) because that would not allow IP routing to properly function. In either case, IP addresses need to be reassigned and reallocated, resulting in tedious subnet reconfigurations and IP network routing topology changes, all of which again must be coordinated between the NAP and the ISP. Additionally, IP address reassignments and reallocations can also require that subscribers reconfigure their equipment, and coordinate with their ISP and/or NAP.

Accordingly, a need exists for a technique which enables IP routing to be efficiently and conveniently implemented within high-speed broadband access networks. It is further desired that this implementation be effected without creating a large administrative or operational burden, and without necessitating significant coordination between generally unrelated entities (i.e., NAPs and ISPs).

SUMMARY OF THE INVENTION

The present invention relates to a system and method of transparent virtual routing designed to enable flexible deployment of IP networking within access networks, at minimal administrative, operational and capital costs. In an exemplary embodiment the inventive transparent virtual routing scheme allows a single large IP subnet to be assigned for a metropolitan region covering several central office facilities, thereby facilitating greater IP addressing flexibility and utilization. Within this IP network, a routing table within a transparent virtual router will generally be established using automatic techniques not requiring substantial processing resources or time-consuming manual intervention.

A number of benefits accrue from the instantiation of higher-layer networking intelligence within the access network by way of the inventive transparent virtual router. For example, IP packets may be directly forwarded within the applicable central office from one subscriber to another. This differs from the routing effected by conventional access networks, which require IP packets to traverse the entire access network to an ISP's IP router for routing back to the same central office. In the case of Voice over IP (VoIP) applications, this means that calls between subscribers served by the same central office facility are carried very efficiently, conserving access network bandwidth. Additionally, multicast IP packets being sent from one or more sources to multiple destinations may be replicated in the central office, which also saves substantial amounts of access network bandwidth. This is especially useful when many subscribers are receiving the very same stream of packets, such as for channels of broadcast video or audio. In addition, each packet can be separately classified based on IP, Transmission Control Protocol (TCP), User Datagram Protocol (UDP), or other header contents, which can then be used to make forwarding, prioritization, and scheduling decisions. Packets may also be blocked or filtered, also based on IP, TCP, UDP, or other header contents. This can be used to improve security and prevent unwanted and undesired application traffic from entering the network.

In one aspect the present invention relates to a transparent routing device disposed within an access network configured in accordance with one or more lower-layer protocols. The inventive device includes a set of subscriber-side ports. Each of the subscriber-side ports is associated with a plurality of virtual subscriber-side interfaces disposed to effectively terminate a corresponding plurality of subscriber-side connections with subscriber host devices served by the access network. The device further includes at least one network-side port through which communication occurs with an external network in accordance with a higher-layer protocol. A routing table is configured to establish a correspondence between network addresses of the subscriber host devices and the plurality of virtual subscriber-side interfaces.

During operation of the device, packets received through the at least one network-side port are forwarded to corresponding ones of the virtual subscriber-side interfaces based upon network addresses of the packets. Packets received through ones of the virtual subscriber-side interfaces are also forwarded to other ones of the virtual subscriber-side interfaces when the packets contain destination addresses corresponding to ones of the network addresses of the subscriber host devices. Similarly, the device may be further configured to forward packets received through ones of the virtual subscriber-side interfaces to the at least one network-side port when the packets do not contain destination addresses corresponding to any of the network addresses of the subscriber host devices.

In another aspect, the present invention relates to a transparent routing device disposed within an access network configured in accordance with one or more lower-layer protocols. The device includes a set of subscriber-side ports operatively coupled to a corresponding set of digital subscriber line access multiplexers. Each of the subscriber-side ports are associated with a plurality of virtual subscriber-side interfaces disposed to effectively terminate a corresponding plurality of virtual circuit connections with subscriber host devices coupled to the digital subscriber line access multiplexers. The device further includes at least one network-side port through which one or more IP-based routes are established. A routing table for establishing a correspondence between IP addresses of the subscriber host devices and the plurality of virtual subscriber-side interfaces is also provided. The device is operative to at least forward IP packets received through the at least one network-side port to corresponding ones of the virtual subscriber-side interfaces based upon IP addresses of the packets.

The present invention is also directed to a transparent routing device disposed within an access network configured in accordance with a lower-layer protocol. The device includes a set of subscriber-side ports and a network-side port in communication with an upstream network operative in accordance with a higher-layer protocol. A first transparent virtual router module defines a first set of virtual subscriber-side interfaces through the set of subscriber-side ports and a first network-side interface though the network-side port. The first set of virtual subscriber-side ports effectively terminates a corresponding first set of subscriber-side connections with a first group of subscriber host devices served by the access network. The device further includes a second transparent virtual router module defining a second set of virtual subscriber-side interfaces through the set of subscriber-side ports and a second network-side interface though the network-side port. The second set of virtual subscriber-side ports effectively terminates a corresponding second set of subscriber-side connections with a second group of subscriber host devices served by the access network.

In another aspect the present invention relates to a method of managing packet flow within an access network configured in accordance with a lower-layer protocol. The access network is in communication with an upstream network characterized by a higher-layer protocol. The method includes defining a plurality of virtual subscriber-side interfaces disposed to effectively terminate a corresponding plurality of subscriber-side connections with subscriber host devices served by the access network. At least one network-side port through which one or more network-side routes are established between the access network and the upstream network is also defined. The method further includes generating a routing table which establishes a correspondence between network addresses of the subscriber host devices and the plurality of virtual subscriber-side interfaces. This permits packets received through the at least one network-side port to be routed to corresponding ones of the virtual subscriber-side interfaces based upon network addresses of the packets.

The present invention is also directed to a method of managing packet flow through a transparent routing device disposed within an access network configured in accordance with a lower-layer protocol. The transparent routing device defines a network-side port and a plurality of subscriber-side ports. The method includes defining a first set of virtual subscriber-side interfaces through the set of subscriber-side ports and a first network-side interface though the network-side port. A second set of virtual subscriber-side interfaces is defined through the set of subscriber-side ports and a second network-side interface is defined though the network-side port. The method further includes routing packets from the first network-side interface to ones of the first set of virtual subscriber-side interfaces in accordance with a higher-layer protocol and routing other packets from the second network-side interface to ones of the second set of virtual subscriber-side interfaces in accordance with the higher-layer protocol.

In yet another aspect the invention pertains to a method of providing differentiated quality of service within an access network in communication with an upstream network. The method includes defining, within the access network, a plurality of virtual subscriber-side interfaces disposed to effectively terminate a corresponding plurality of subscriber-side connections with subscriber host devices served by the access network. The method further includes defining first and second network-side connections between the access network and the upstream network such that the first network-side connection is associated with a first quality of service and the second network-side connection is associated with a second quality of service. The method also includes routing data packets between the plurality of virtual subscriber-side interfaces and the first and second network-side connections in accordance with quality of service levels characterizing the data packets.

In exemplary embodiments the transparent virtual router of the present invention is configured to be deployed as an intermediate node within an access network. When so deployed the inventive virtual router functions to segregate traffic on the basis of information contained within higher-layer protocols than that used to define the logical circuits of the access network. For example, in an ATM-based access network comprised of virtual circuits, the transparent virtual router examines the higher-layer protocol information within each ATM packet, including information at the Ethernet, PPP, IP, TCP, UDP and possibly other layers. Based upon this examination, traffic is routed in accordance with the routing table established within the transparent virtual router.

In the case of DSL-based access networks, the transparent virtual router will typically be deployed between the DSLAMs of the access network and the initial ATM switch of the wide area network. The transparent virtual router then operates to appropriately route the traffic associated with each subscriber line directly to and from an IP network, the wide-area network, and the DSLAMs of the access network. In the upstream direction, the transparent virtual router scrutinizes the higher-layer protocol information encapsulated within each lower-layer packet. For example, in the case of an ATM-based wide area network the transparent virtual router may examine addressing information for layer 3 or higher-layer protocols. The transparent virtual router then routes the packetized data by consulting its routing table on the basis of the higher-layer addressing information. Downstream data received by the transparent virtual router from, for example, an ATM-based wide area network and an IP network, may be similarly effected.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Architectural and Operational Overview

Figure 1:
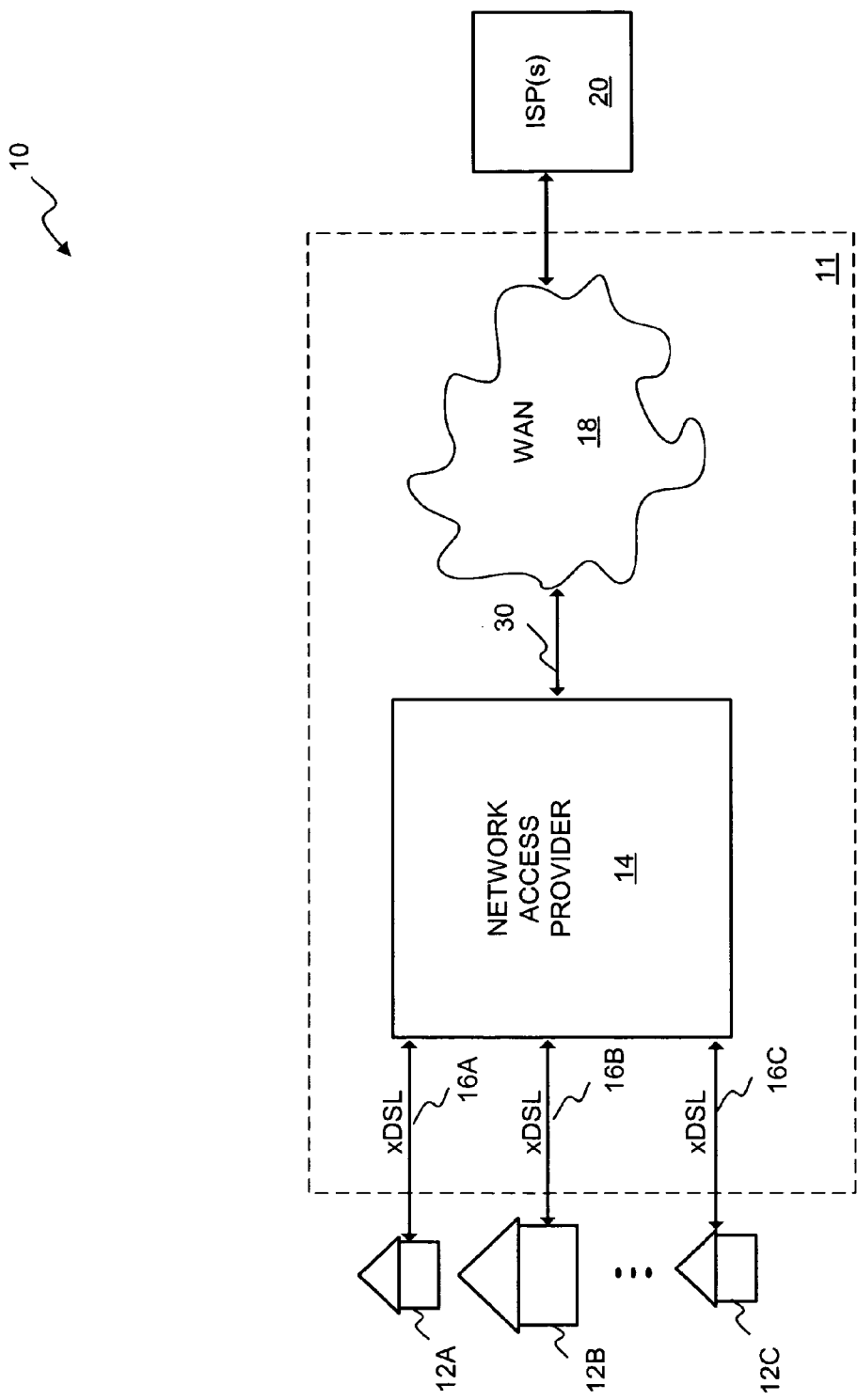
FIG. 1 is a block diagram of an exemplary telecommunications system containing a DSL-based access network.
Figure 2:
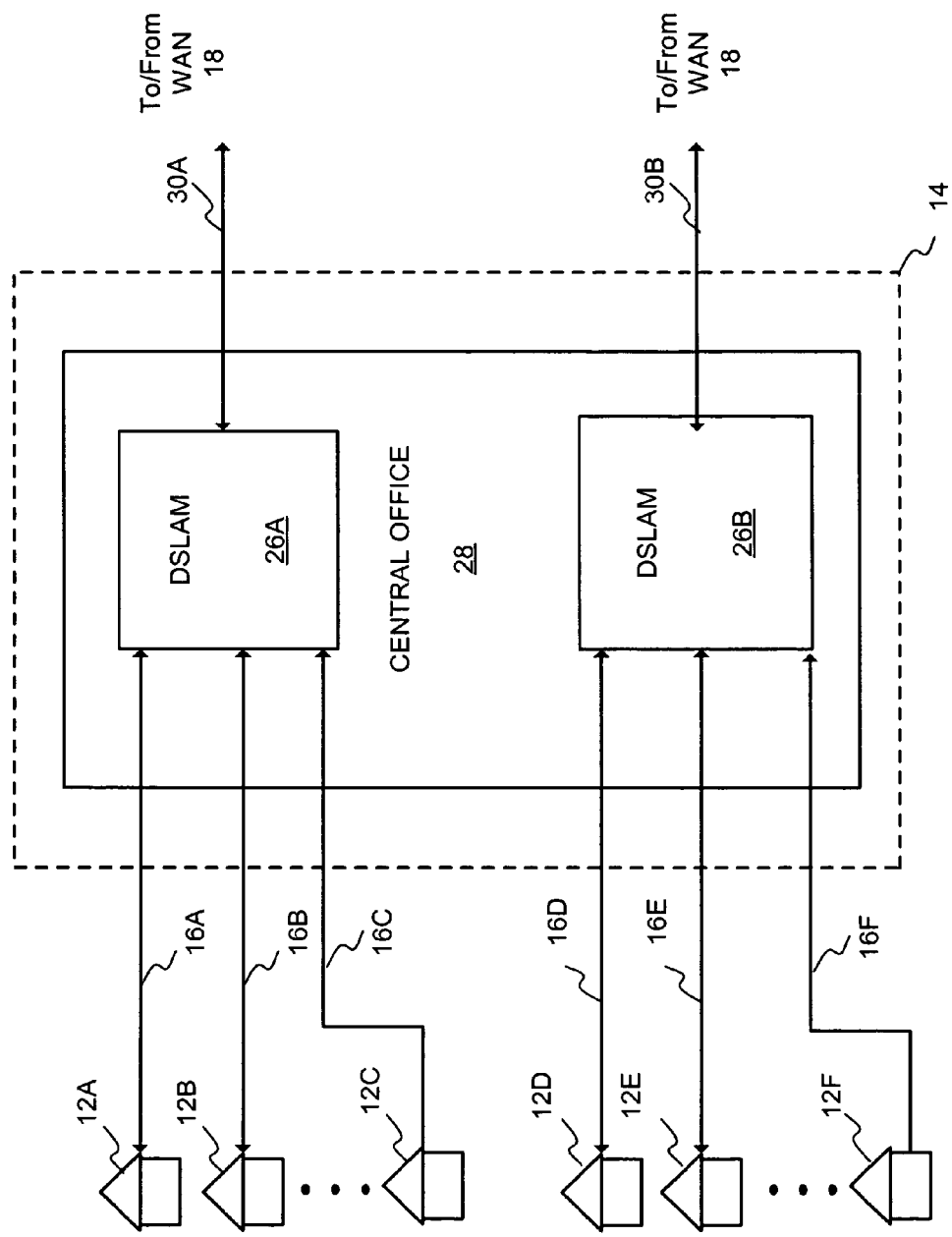
FIG. 2 illustratively represents an exemplary configuration of equipment utilized by a network access provider (NAP) included within the DSL-based access network of FIG. 1.
Figure 3:
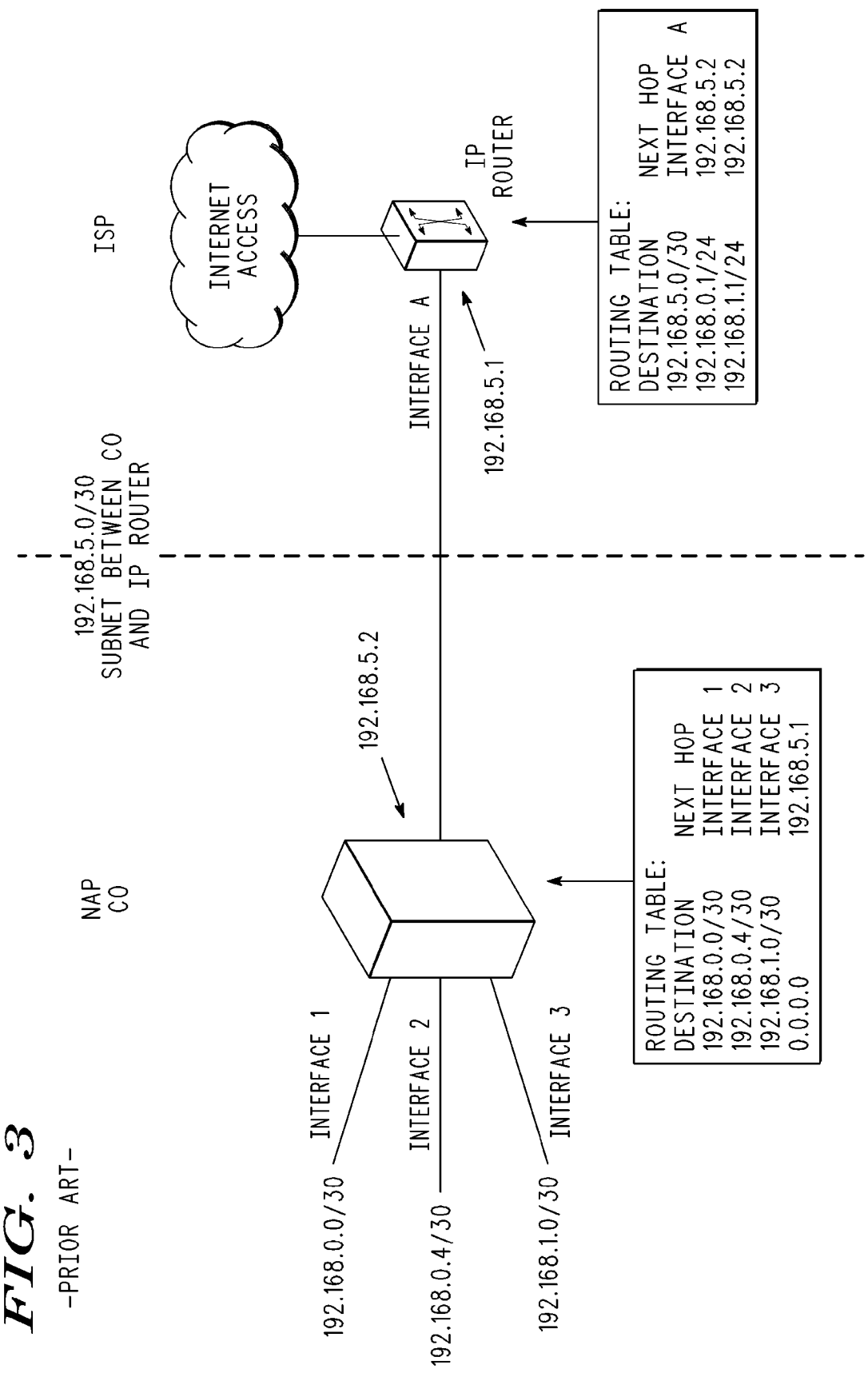
FIG. 3 illustrates an access network in which an IP subnet has been established between the central office (CO) facility of a NAP and an Internet Service Provider (ISP).
Figure 4:
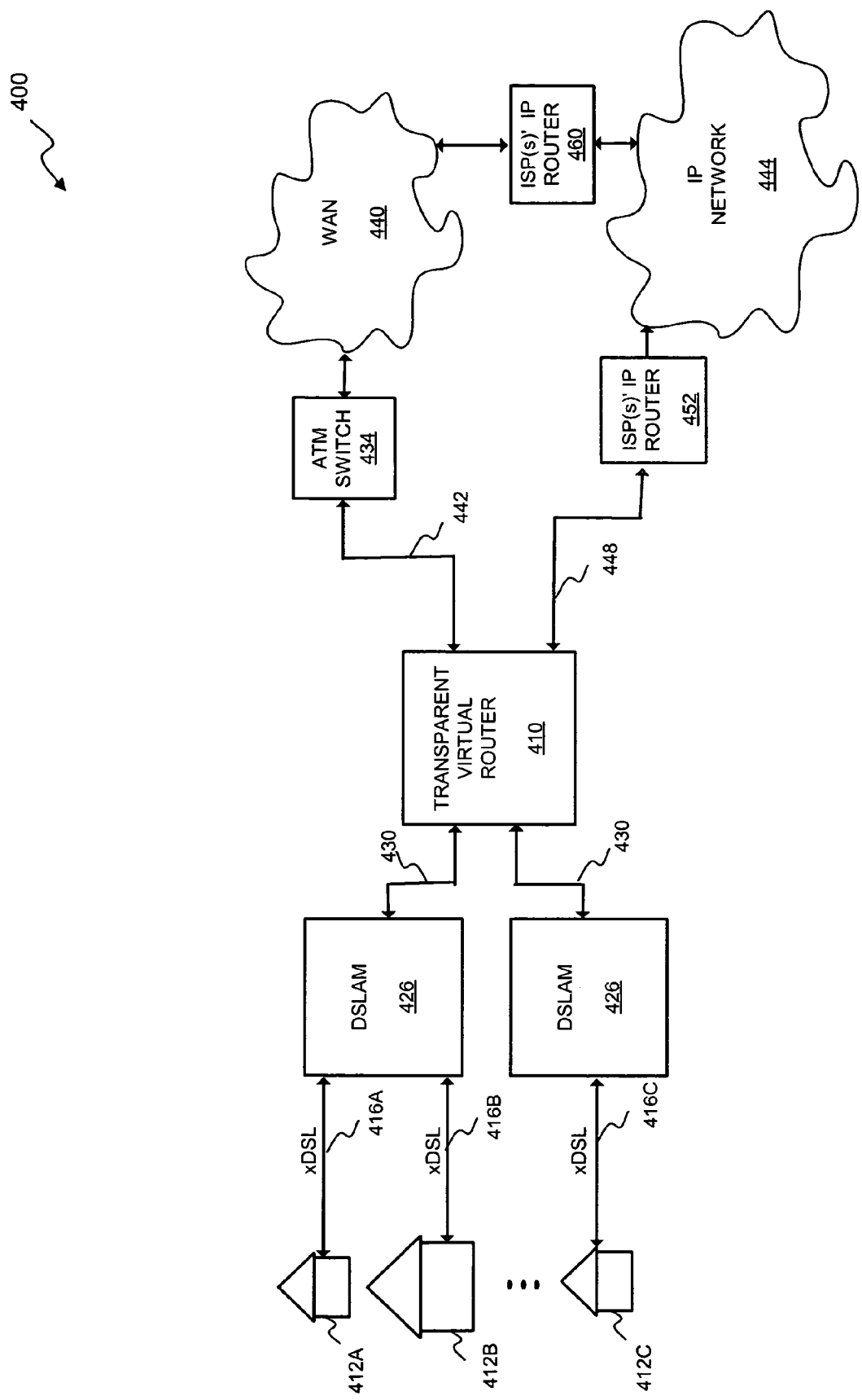
FIG. 4 is a block diagram of a telecommunications system incorporating a transparent virtual router operative in accordance with the present invention.

FIG. 4 is a block diagram of a telecommunications system 400 incorporating a transparent virtual router 410 operative in accordance with the present invention. In the system 400, units of conventional DSL-based customer premises equipment (CPE) (not shown) disposed within a plurality of subscriber locations 412 are connected to a set of DSLAMs 426 over xDSL links 416. In FIG. 4, the DSLAMS 426 are located at a central office (not shown) or at an outside plant location or other facility positioned near enough subscriber locations 412 to enable xDSL transmission to be effected over xDSL links 416. The transparent virtual router 410 will generally be co-located with one or more DSLAMs 426 within a central office facility. In this case it is economically feasible to use a high-speed trunk 430 to connect each DSLAM 426 to a designated port of the transparent virtual router 410, since the high-speed trunk 430 typically traverses only a short distance within the central office facility.

In operation, each DSLAM 426 performs adaptation between the xDSL links 416 and the applicable high-speed trunk 430. In the downstream direction (i.e., towards the subscriber locations 412), each DSLAM 426 may perform switching and demultiplexing of framed data information or ATM cells received over the high-speed trunk 430. In the upstream direction (i.e., towards the applicable high-speed trunk 430), each DSLAM 426 may perform multiplexing and concentration of framed data information or ATM cells received over the xDSL links 416 for transmission on the high-speed trunk 430. In the exemplary embodiment the high-speed trunk 430 may support, for example, a plurality of ATM virtual circuits or a plurality Ethernet Virtual Local Area Networks ("VLANs") disposed to carry the data traffic associated with the plurality of xDSL links 416.

The transparent virtual router 410 interfaces with an ATM switch 434 of an ATM-based wide area network (WAN) 440, or metropolitan area network (MAN), through a high-speed connection 442 such as a SONET ring. As shown, the transparent virtual router 410 is also in communication with one or more IP router(s) 452 of one or more ISP(s) through a high-speed connection 448 (e.g., a fiber optical gigabit Ethernet connection or Packet Over SONET connection), thereby facilitating access to an IP network 444 (e.g., the Internet). The IP router(s) 452 are configured with interfaces compatible with the type of the high-speed connection 448 (e.g., Ethernet). The WAN 440 typically will also be communicatively coupled to the IP network 444 through one or more IP routers 460 of one or more ISP(s), each of which will include interfaces consistent with the type of the ATM network 440.

As is described herein, the transparent virtual router 410 functions to perform IP-based routing of downstream traffic from the IP network 444 to a subscriber location 412 containing end user equipment to which the downstream traffic is addressed. Specifically, the transparent virtual router 410 serves as an endpoint for a set of virtual circuits terminating at the subscriber locations 412. In this regard the transparent virtual router 410 terminates all lower-layer protocols, including ATM virtual circuits and point-to-point (PPP) layer encapsulation. The transparent virtual router 410 is also configured to handle the high-speed trunk interfaces 430 (e.g., DS-3/E3, OC-3/STM-1, OC-12/STM-4, or Ethernet) in communication with the DSLAMs 426.

In the upstream direction, the transparent virtual router 410 routes traffic received from the virtual circuit of a given subscriber to either the ISP(s) 452 or to the ATM switch 434 or to another subscriber 412. The transparent virtual router 410 will generally be configured to aggregate the upstream traffic from the virtual circuits terminating at the subscriber locations 412 destined for the WAN 440 onto a substantially smaller number of virtual circuits traversing the ATM switch 434. In one embodiment the transparent virtual router 410 may be implemented using a VantEdge™ Access BRAS available from Copper Mountain Networks, Inc. of Palo Alto, Calif.

Consistent with the invention, the transparent virtual router 410 performs the routing function described above by examining the protocol information (e.g., IP, UDP and TCP-layer information) within a layer higher than the layer of the underlying layer-2 switching protocol (e.g., ATM). Effecting routing at the IP layer advantageously enables the transparent virtual router 410 to implement a number of IP-layer quality of service (QoS) and security functions. These functions may include (i) packet filtering operations designed to, for example, prevent IP source address spoofing, (ii) direction of packets into various queues accorded different prioritization and QoS levels, and (iii) the metering of IP-layer traffic flows. The capability of the transparent virtual router 410 to perform IP-based forwarding within the access network is one feature distinguishing it from conventional approaches, which typically employ ATM or Ethernet switches to effect ATM-layer forwarding or Ethernet-layer forwarding, respectively. Advantageously, the transparent virtual router 410 need not be capable of implementing computationally-intensive dynamic routing protocols such as, for example, RIP, OSPF, or BGP. Although such routing protocols may in fact be executed in certain embodiments of the inventive router 410, it is a feature of the inventive transparent virtual router that it may effect IP-based packet routing within an access network without requiring use of such protocols.

Transparent Routing

Figure 5:
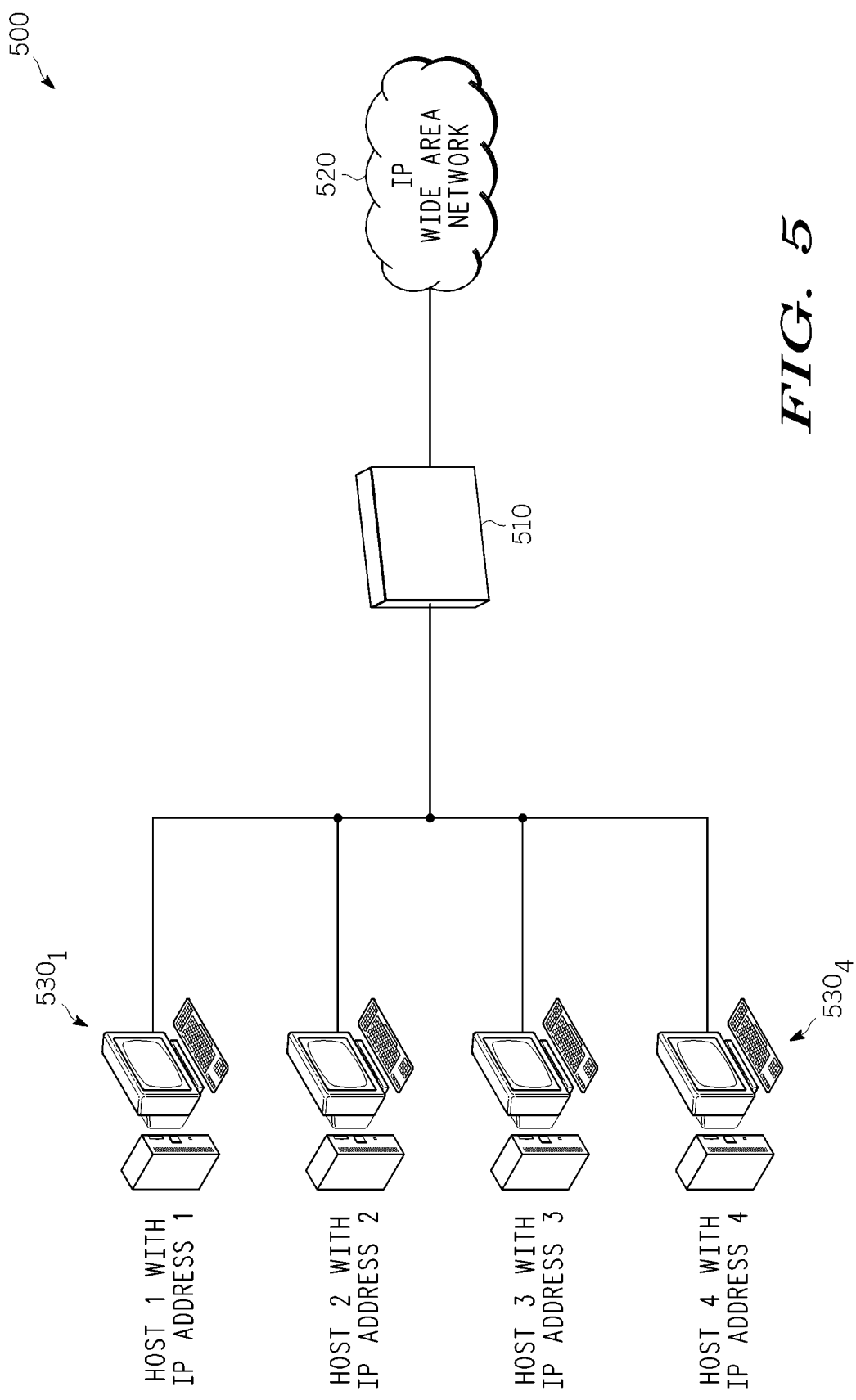
FIG. 5 is a simplified illustrative representation of an access network which demonstrates the manner in which the inventive transparent virtual router may be considered to be "transparent" to other system elements.

FIG. 5 is a simplified illustrative representation of an access network 500 which demonstrates the manner in which the inventive transparent virtual router 510 may be considered to be "transparent" to other system elements. In this regard the routing performed by the transparent virtual router 510 may characterized as "transparent" in the sense that it effectively extends an IP WAN 520 to include a plurality of host devices 530. That is, from the perspective of the IP WAN 520 each host device 530 appears to have an IP address directly on the IP WAN 520. It follows that the transparent virtual router 510 is invisible, i.e., "transparent" to the IP WAN 520. The transparent virtual router 510 determines the host device 530 to which a packet should be sent by using the destination IP address of the packet as an index into one or more virtual routing tables maintained by the router 510. As is described below, the contents of these tables may be automatically learned and configured by the transparent virtual router 510 without the need for manual intervention.

For purposes of clarity, FIG. 5 does not explicitly depict the one or more DSLAMs interposed between the transparent virtual router 510 and the set of subscriber host devices 530. This approach is also followed in FIGS. 6-14 in order to enhance the clarity of these representations. It is further observed that in alternate implementations the functionality of one or more DSLAMs may be integrated with that of transparent virtual router within a single physical device. This type of implementation is exemplified by the VantEdge™ Broadband Services Concentrator available from Copper Mountain Networks, Inc. of Palo Alto, Calif.

Transparent Virtual Routing (TVR) Groups

Figure 6:
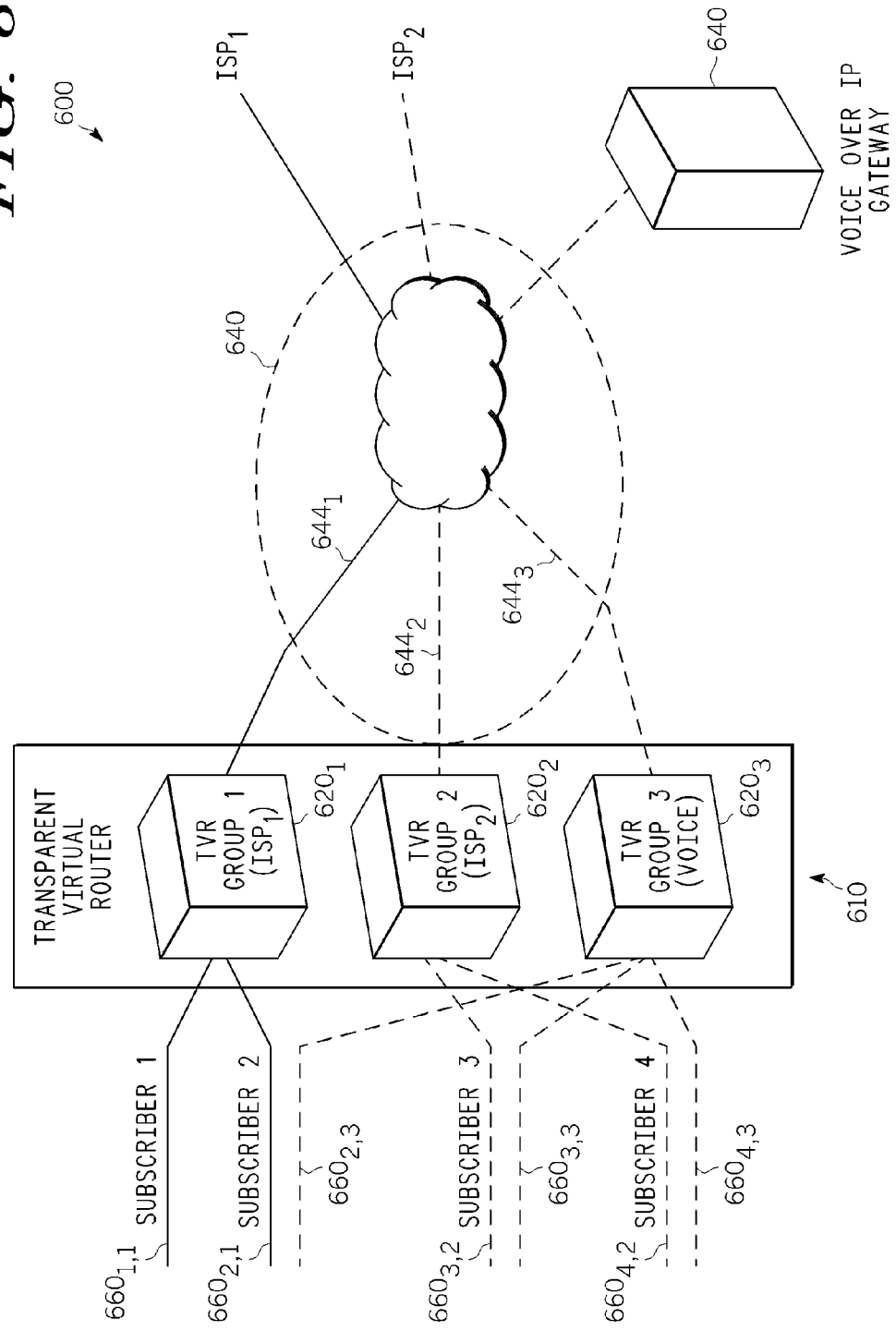
FIG. 6 depicts an access network in which is included an implementation of the inventive transparent virtual router containing several software-defined instances of a transparent routing function.

Turning now to FIG. 6, an access network 600 is depicted which illustratively represents another distinguishing characteristic of the inventive transparent virtual router 610; namely, that several software-defined instances of the transparent routing function described above may be provided in a single hardware platform. That is, a number of "virtual" transparent routers, or independent "transparent virtual router (TVR) groups" 620, may be co-located and instantiated within such a platform. "Independence" among the TVR groups 620 refers to the fact that packet traffic is not permitted to be directly forwarded between TVR groups 620, thereby ensuring the existence of complete security between such groups 620. The TVR groups 620 are also independent in the sense that IP addresses within each group 620 are considered to be in separate domains. As a result, IP addresses may overlap (i.e., be the same) between TVR groups 620, which facilitates private IP addressing. This type of independence also facilitates the use of IP-based quality of service (QoS) mechanisms, thereby enabling prioritized allocation of available bandwidth among (i) different services, and (ii) the traffic of different service providers, which is separately handled by different TVR groups 620.

As shown in FIG. 6, a set of three TVR groups 620 are defined within the transparent virtual router 610. Specifically, a first TVR group $620_1$ and a second TVR group $620_2$ are disposed to process traffic associated with a first ISP ($ISP_1$) and a second ISP ($ISP_2$), respectively. Network-side communication with the TVR groups 620 is facilitated by an ATM-based wide area network 640 within which a virtual circuit 644 is established for each TVR group 620. In addition, a third TVR group $620_3$ is assigned to handle the traffic flowing through a Voice over IP (VoIP) gateway 640. In the exemplary implementation of FIG. 6 a given individual DSL subscriber may communicate with multiple TVR groups 620 through establishment of corresponding separate virtual circuits 660 between the subscriber's CPE (not shown) and the transparent virtual router 610. In the exemplary embodiment of FIG. 6, the second subscriber is shown to be in communication with the first TVR group $620_1$ over virtual circuit $660_{2,1}$ and with the third TVR group $620_3$ over virtual circuit $660_{2,3}$. Because multiple instances of TVR groups 620 exist within the transparent virtual router 610, each DSL subscriber is generally associated with a "virtual" port of one or more TVR groups rather than with a physical port of the router 610.

Routing within TVR Groups

Figure 7:
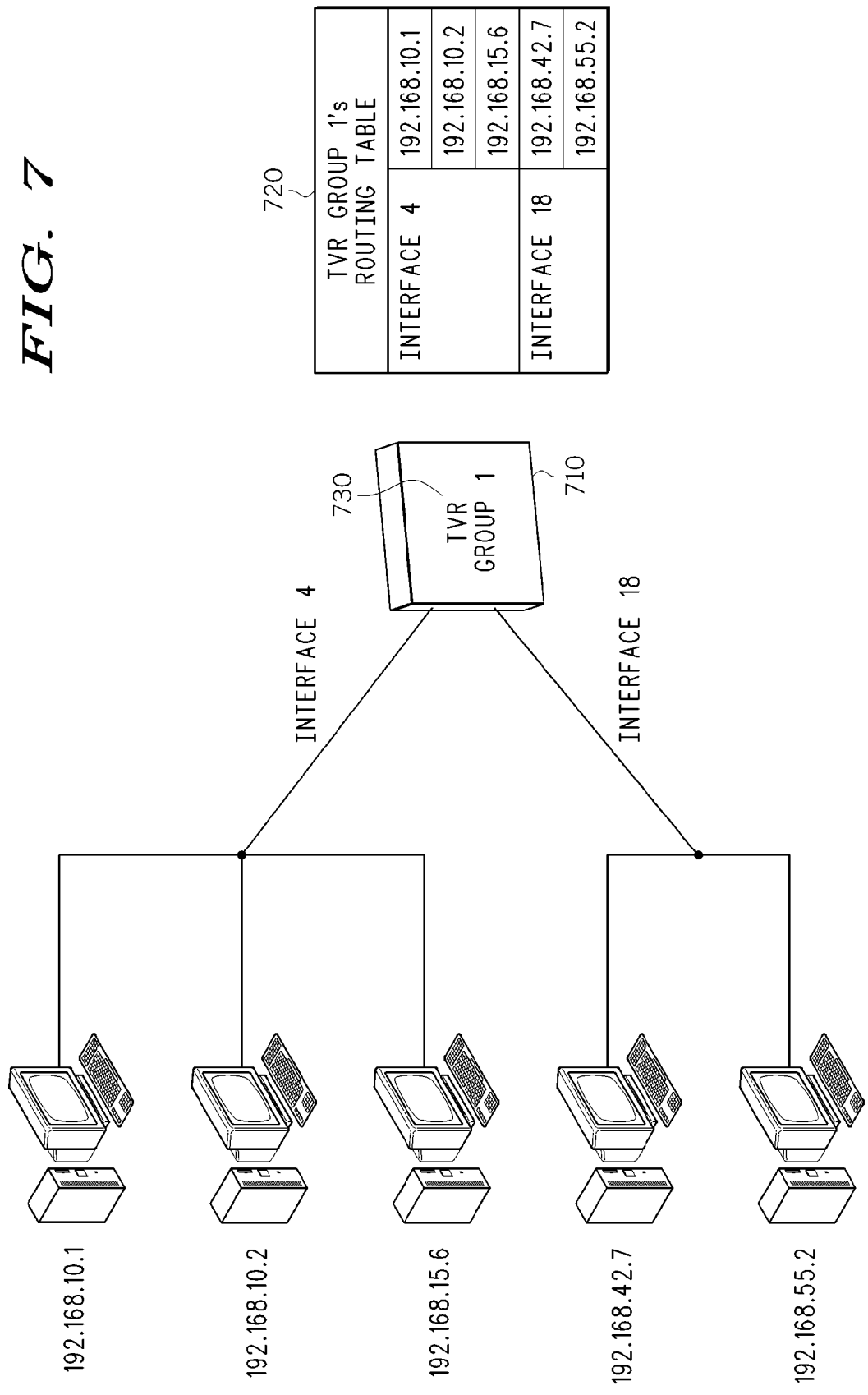
FIG. 7 illustratively represents a transparent virtual router and a routing table associated with a transparent virtual routing group of the router.

FIG. 7 illustratively represents a transparent virtual router 710 and a routing table 720 associated with a TVR group 730 of the router 710. Attention will be directed to FIG. 7 in describing the manner in which packets are routed within TVR group 730 consistent with the invention. As is indicated by FIG. 7, each entry of the routing table 720 corresponds to an interface of the router 710 used by the TVR group 730. In this regard the interfaces associated with the entries within the routing table 720 comprise "virtual" interfaces (e.g., PPP session endpoints and/or ATM virtual circuit endpoints and/or Ethernet VLAN endpoints), rather than physical port interfaces. For each such interface, a list of host IP addresses belonging to that interface is maintained within the routing table 720. One benefit of this approach is that a given subscriber interface may be assigned an arbitrary number of IP addresses, unconstrained by conventional IP subnet addressing limitations. During operation of the router 710, the destination IP address of a received IP packet is compared with entries in the appropriate TVR group routing table (e.g., routing table 720). If a match is identified, the received IP packet is forwarded to the appropriate virtual interface of the router 710. The virtual interface (e.g., a PPP session within an ATM virtual circuit within an ATM trunk interface to a DSLAM) is resolved into a physical interface, the appropriate network protocol encapsulations (e.g. PPP, ATM adaptation layer) and lower-layer addressing information (e.g. PPP session identifier, ATM virtual path/virtual circuit identifier) are added, and the packet is sent out the appropriate physical interface on the router 710. If a match is not identified and the packet was received from a subscriber, then the IP packet is forwarded on the interface of the router 710 corresponding to the upstream network (i.e., the network-side interface). If a match is not found and the IP packet was received from the network-side interface, then the IP packet is discarded.

Referring again to the routing table 720 of FIG. 7, it is seen that the TVR group 730 is associated with a pair of virtual subscriber-side interfaces (i.e., Interface 4 and Interface 18) of the router 710. Each of these subscriber-side interfaces effectively terminates a virtual circuit connection with several hosts at the premises of a particular subscriber. It may thus be appreciated that the routing table 720 functions to bind subscriber IP addresses to virtual subscriber-side interfaces of the router 710, which are then resolved into physical interfaces of the router 710. In exemplary embodiments a transparent virtual router may potentially support many thousands of virtual interfaces through a much smaller number (e.g., 20 or less) of physical interfaces. Accordingly, each physical interface (e.g., a DSLAM trunk) of a transparent virtual router is often associated with many hundreds, or even thousands, of virtual interfaces (e.g., subscriber PPP sessions and/or ATM virtual circuits carried by DSLAM trunks). In the implementation of FIG. 7, the virtual circuit associated with each subscriber-side interface (e.g., Interface 4) is carried on a line such as xDSL, T1/E1, DS-3/E3, OC-3/STM-1, and OC-12/STM-4. In the interests of clarity of presentation, FIG. 7 does not depict the intermediate or endpoint devices which carry and terminate, respectively, such subscriber-side virtual circuits.

Figure 8:
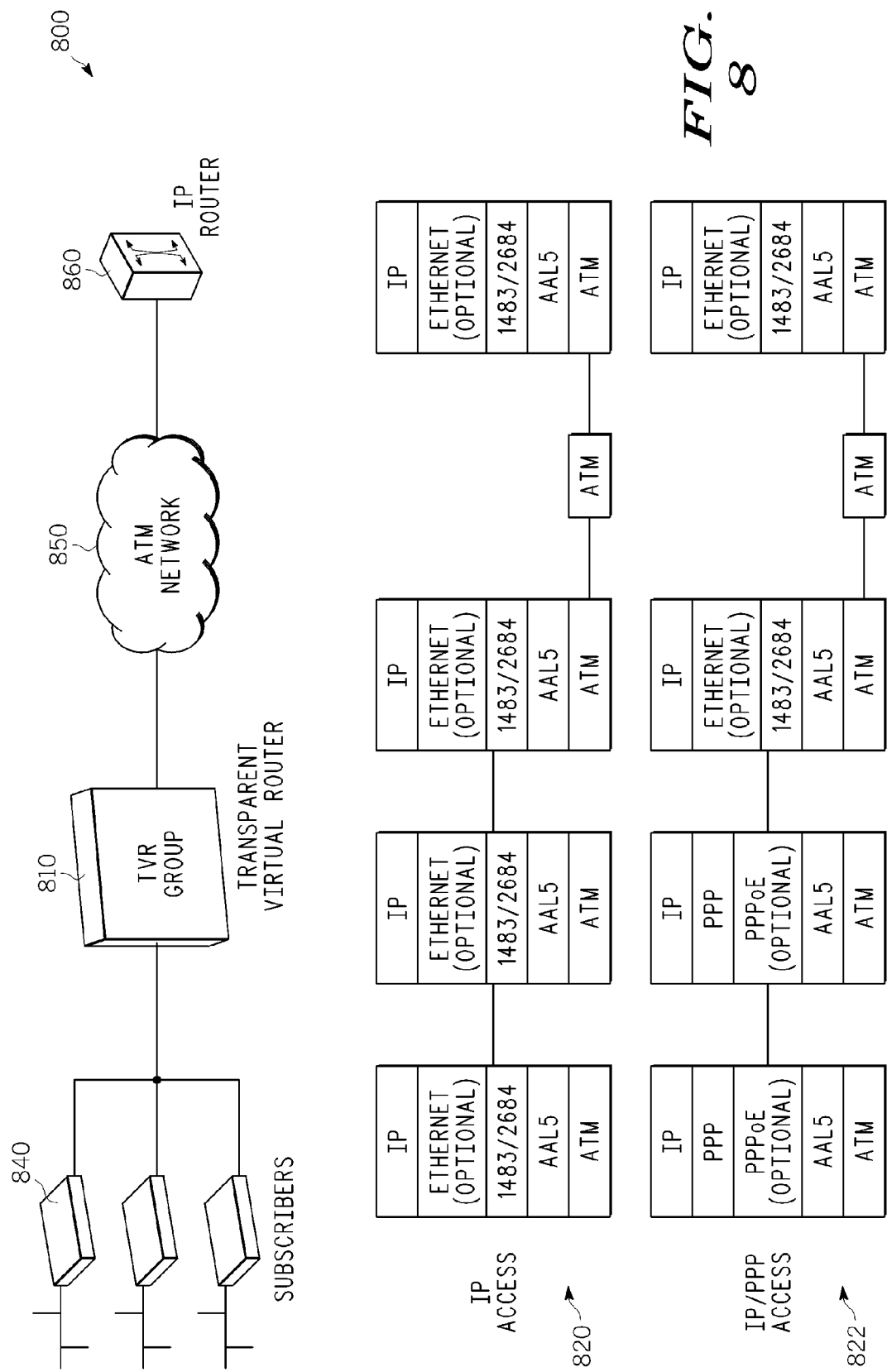
FIG. 8 provides a simplified representation of an access network which illustrates the manner in which IP packets may be received within any of several standard data link layer encapsulations and processed by the inventive transparent virtual router.

FIG. 8 provides a simplified representation of an access network 800 which illustrates the manner in which IP packets may be received within any of several, but not all possible, standard data link layer encapsulations and processed by the inventive transparent virtual router 810. To this end, FIG. 8 also depicts protocol stacks 820 and 822 for IP access and IP/PPP access, respectively, in association with the various elements of the access network 800. In one embodiment the data link layer encapsulation comprises IP over Ethernet (IPoE) carried on an ATM virtual circuit. In other implementations, the IPoE packets may be carried on a frame relay virtual circuit, or natively over an Ethernet physical interface. The use of IPoE allows utilization of simple, inexpensive CPE 840 (e.g., DSL Ethernet modems) at subscriber locations. In alternate embodiments transparent virtual routing may also be performed by terminating a subscriber PPP session. In this case the PPP session may be carried either directly over an ATM Adaptation Layer 5 (AAL5) per RFC 2364 (PPP over ATM (PPPoA)), or over Ethernet per RFC 2516 (PPP over Ethernet (PPPoE)). Likewise, use of the Ethernet layer within the WAN link 850 between the transparent virtual router 810 and an upstream IP router 860 is also optional.

IP Subnets Encompassing Multiple Transparent Virtual Routers and TVR Groups

Figure 9:
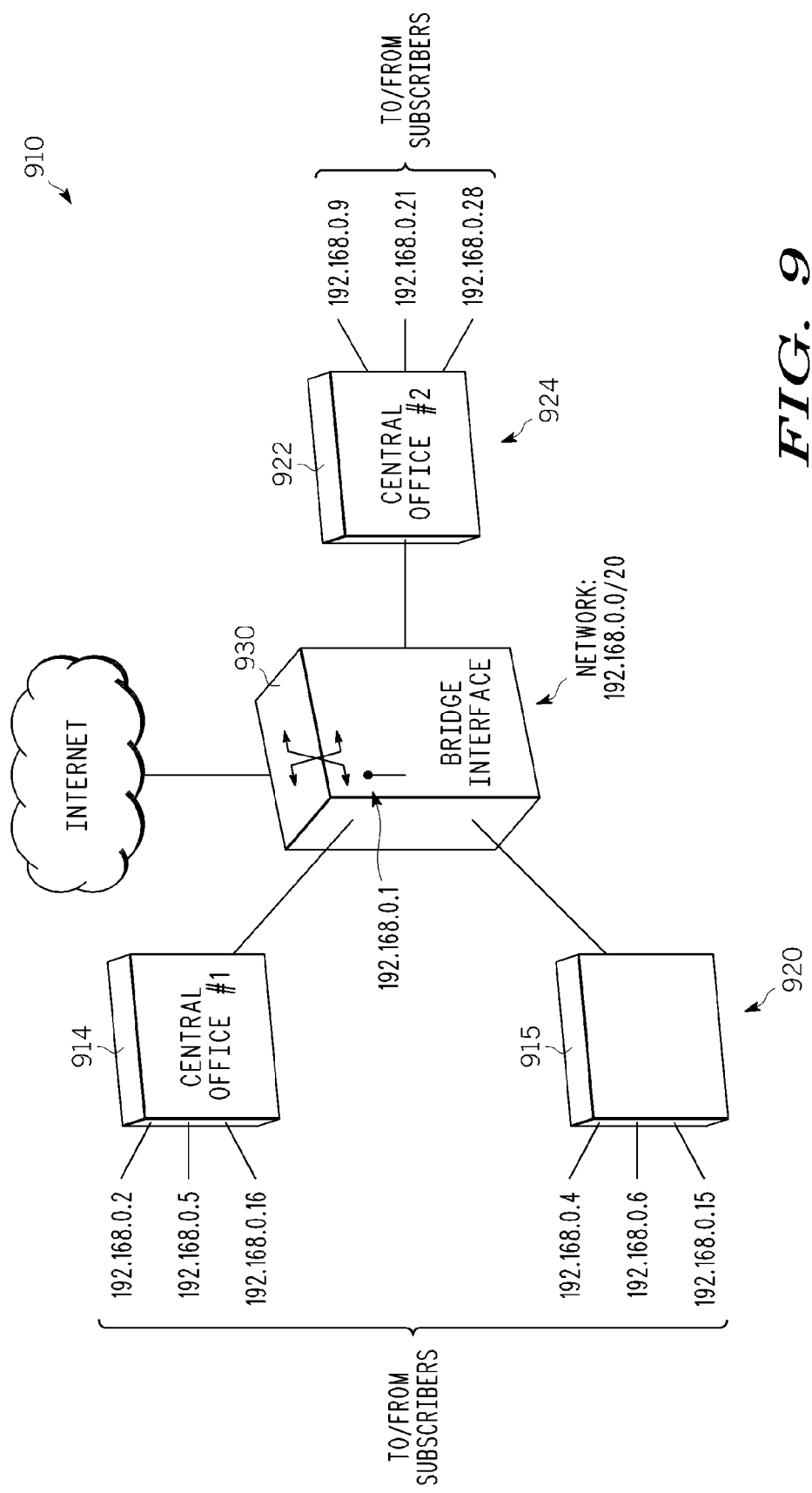
FIG. 9 provides a simplified representation of an access network to which reference is made in describing the use of an upstream bridge group and Internet Protocol over Ethernet (IPoE) encapsulation in accordance with one aspect of the invention.
Figure 10:
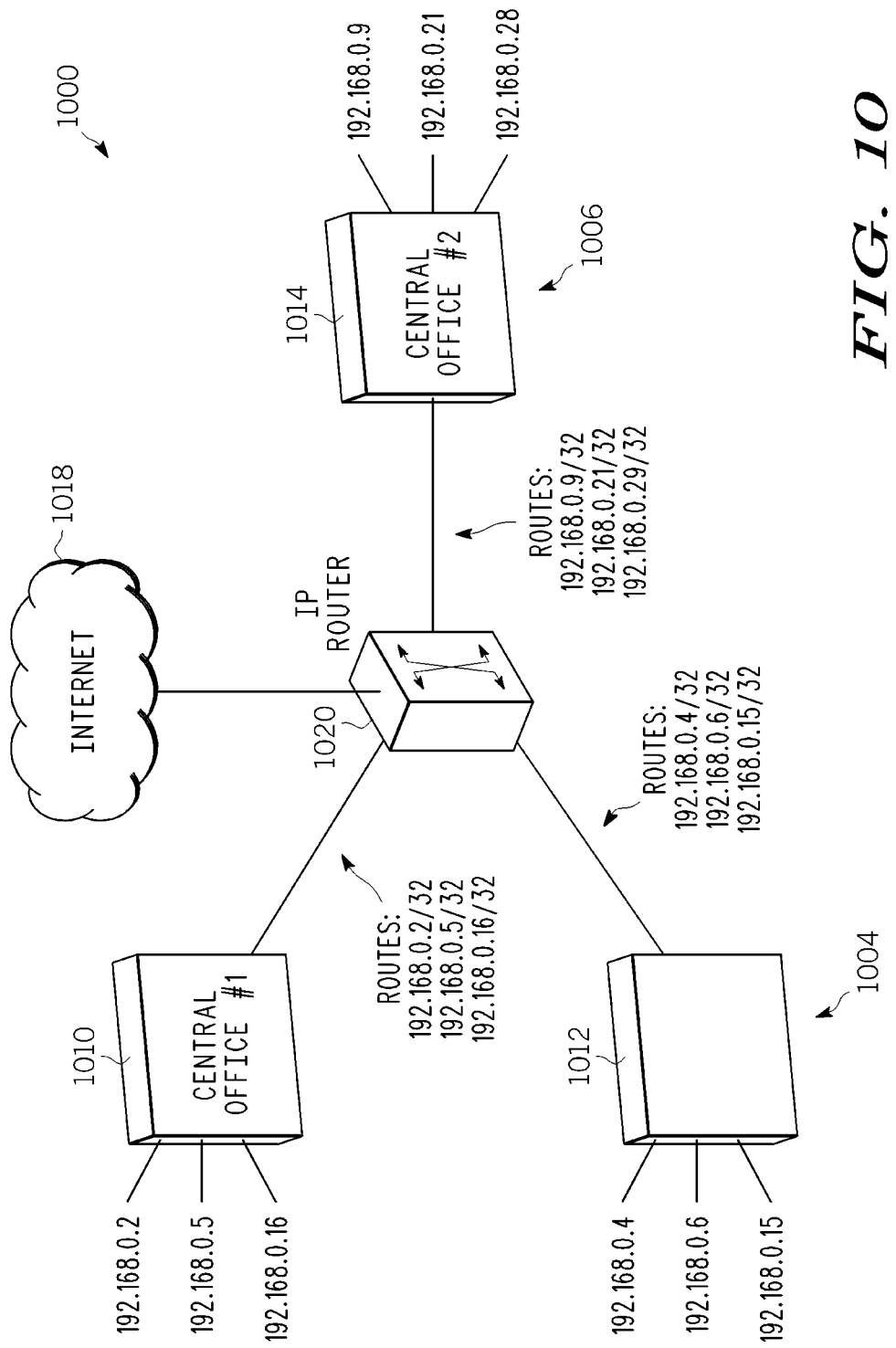
FIG. 10 illustratively represents an access network to which reference is made in describing a particular approach to establishing a large IP subnet across multiple transparent virtual routers of the invention.

In accordance with the invention, large IP subnets may be established across multiple transparent virtual routers and the TVR groups within such routers. As described previously, this delivers very significant benefits to the applicable NAP and ISPs, by simplifying IP address administration, simplifying subnet design, reducing the need for network design changes, and minimizing coordination and communication between the NAP and the ISPs. At least two approaches have been contemplated for establishing such large IP subnets. The first of these approaches is based upon packet forwarding using a "bridge group" of an IP router upstream from a transparent virtual router, while the second approach relies upon effecting large-scale host routing within such an upstream IP router. In the former case packets are forwarded between the transparent virtual router and the upstream bridge group as IP packets encapsulated within Ethernet frames (i.e., IPoE, Internet Protocol over Ethernet), while in the latter case such encapsulation is not necessarily employed. FIGS. 9 and 10 respectively illustratively represent these two different approaches to establishment of a large IP subnet across multiple transparent virtual routers and the TVR groups therein.

Forwarding Using an Upstream Bridge Group

Turning now to FIG. 9, the case involving use of an upstream bridge group and IPoE encapsulation is described with reference to a simplified representation of an access network 910. As shown, the access network 910 contains a pair of transparent virtual routers 914, 915 disposed within a first central office facility 920 and a third transparent virtual router 922 located in a second central office facility 924. The access network 910 carries IPoE traffic via TVR groups of the transparent virtual routers 914, 915, 922 to a regional IP router 930. In the implementation of FIG. 9 the IP router 930 has a routing context with a virtual bridge interface, a common feature in IP router platforms. A virtual circuit from a TVR group on each transparent virtual router 914, 915, 922 is connected to the virtual bridge interface of the IP router 930. In operation the IP router 930 functions to create a large bridge group through which all traffic from the TVR groups of the transparent virtual routers 914, 915, 922 is bridged together at the Ethernet layer by referencing the Ethernet Media Access Control (MAC) destination and source addresses in each IPoE packet, thereby creating a single large IP subnet encompassing all such TVR groups.

Within the context of the access network 910 of FIG. 9, IP address assignment and management may be straightforwardly effected. Specifically, an Internet Service Provider need only allocate a single, large subnet (e.g., 192.168.0.0/20 in FIG. 9) spanning the first and second central office facilities 920, 924. As new subscribers are provisioned, the ISP can allocate any and all IP addresses within this address space, assigning IP addresses to subscribers without regard to boundaries of the central office facilities 920, 924. In particular, there is only a single route that the ISP uses—the direct route to network 192.168.0.0/20 on the interface 192.168.0.1.

A number of benefits accrue from use of the inventive transparent virtual router within an access network containing an upstream bridge group, as is exemplified by FIG. 9. For example, the IP router 930 need be configured with only one route (i.e., the route associated with the bridge group), and this route is only configured once. In addition, additional transparent virtual routers may be easily added to the access network 910 following initial network deployment. All that is required is provisioning a single virtual circuit from the new transparent virtual router to the IP router 930 for termination within its bridge group. Further, adding a new subscriber only requires provisioning a virtual circuit for the subscriber to one of the transparent virtual routers and adding it to a particular TVR group. As is discussed below, each transparent virtual router is capable of "autoconfiguring" itself using the IP address of the new subscriber.

The configuration of FIG. 9 is further advantageous in that it yields a simple network design (i.e., one large subnet is much simpler to implement and administer than many small subnets), and enables efficient use of the available IP address space. That is, a single large pool of addresses may be utilized more efficiently than many smaller address pools. In addition, this configuration does not require ISPs to modify their existing operations or networks.

Forwarding Using Upstream Large-Scale Host Routing

FIG. 10 illustratively represents an access network 1000 to which reference will be made in describing a second approach to establishing a large IP subnet across multiple transparent virtual routers of the invention. As shown, the access network 1000 includes first and second central office facilities 1004, 1006 in communication with an upstream network 1018. A pair of transparent virtual routers 1010, 1012 is disposed within the first central office facility 1004 and transparent virtual router 1014 is located within the second central office facility 1006. As shown in FIG. 10, the access network 1000 interfaces with an IP router 1020.

Consistent with this second approach to IP subnet creation, subscriber IP addresses are assigned in the manner described below to each TVR group of the transparent virtual routers 1010, 1012, 1014. In addition, a corresponding "host route", i.e., a route based upon a direct match of all 32 bits of the IP address field, is provisioned into the IP router 1020 for each and every subscriber IP address. That is, like the transparent virtual routers 1010, 1012, 1014, the IP router 1020 is operative to effect "host routing" of incoming downstream traffic by examining all 32 bits in the IP address field of each downstream packet. In an exemplary embodiment the set of subscriber IP addresses used across the transparent virtual routers 1010, 1012, 1014 may be drawn from a single, large IP subnet. IP addresses from this large IP subnet are allocated in any fashion across the subscriber interfaces of each of the transparent virtual routers 1010, 1012, 1014.

Use of an access network and IP router configuration of the type exemplified by FIG. 10 also affords several advantages. For example, a new transparent virtual router may be added to the access network 1000 by provisioning a single virtual circuit between the IP router 1020 and a TVR group within the newly added transparent virtual router. To add a new subscriber, a virtual circuit is provisioned between the subscriber and the applicable TVR group of the new transparent virtual router. Again, the transparent virtual router is capable of autoconfiguring itself with respect to the subscriber's IP address in the manner described below.

The configuration of FIG. 10 is further advantageous in that it yields a simple network design (i.e., one large subnet is much simpler to implement and administer than many small subnets), and enables efficient use of the available IP address space. That is, a single large pool of addresses may be utilized more efficiently than many smaller address pools. In addition, this configuration does not require ISPs to modify their existing operations or networks.

IP Address Autoconfiguration

FIGS. 11-13 illustrate various approaches which may be employed, in isolation or concurrently, to automatically learn the IP addresses of the subscribers associated with a particular TVR group and automatically effect corresponding configuration of such group. In various embodiments of the invention some or all of the set of IP addresses associated with a TVR group may be statically configured, or they may be automatically learned and configured. This autoconfiguration capability advantageously completely removes the applicable NAP from the process of managing IP address allocation within the transparent virtual routers of the invention. Three methods of performing this IP address autoconfiguration process are described below.

DHCP Snooping

Figure 11A:
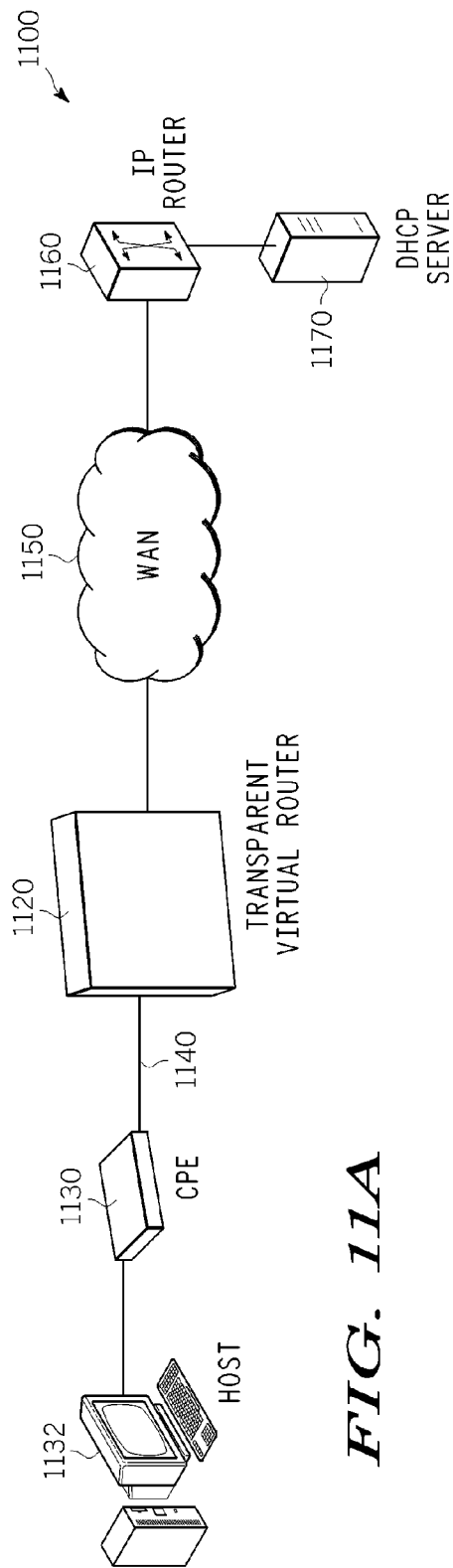
FIG. 11 provides a simplified representation of an access network and associated signal flow diagram to which reference is made in describing the manner in which IP address autoconfiguration within a transparent virtual routing (TVR) group may be performed using Dynamic Host Control Protocol (DHCP) snooping.
Figure 11B:
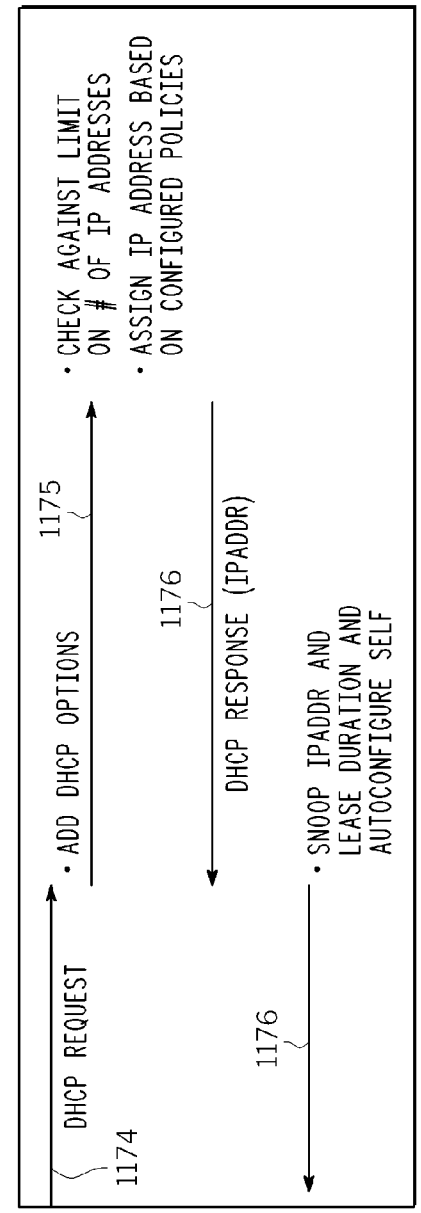

FIGS. 11A and 11B respectively illustrate a simplified access network 1100 and an associated signal flow diagram 1110 to which reference will be made in describing the manner in which IP address autoconfiguration within a TVR group may be performed using Dynamic Host Control Protocol (DHCP) snooping. As shown in FIG. 11A, the access network 1100 includes a transparent virtual router 1120 in operative communication with the CPE 1130 and host 1132 of each subscriber over an xDSL link 1140 terminated at a DSLAM (not shown) between the transparent virtual router 1120 and the CPE 1130. The access network 1100 further includes a wide area network 1150 (e.g., an ATM network) having a connection to an IP router 1160. As shown, a DHCP server 1170 within the Internet communicates with the IP router 1160.

In the system of FIG. 11, the access network 1100 provides IP-based access to each subscriber. To this end, the DHCP server 1170 is used to assign IP addresses to the subscribers served by the access network 1100. The DHCP is defined in RFCs 2131, 2132, and 3046, and essentially comprises a method for a host to request and obtain an IP address. Consistent with this method and as is illustrated by FIG. 11B, a host 1132 or CPE 1130 sends a DHCP request 1174 to the transparent virtual router 1120. The transparent virtual router 1120 receives the request 1174 and adds the following industry-standard DHCP options, thereby creating an augmented DHCP request 1175: Option 61 (Client Identifier) and Option 82 (Relay Agent Information). The transparent virtual router 1120, acting as a DHCP relay agent, forwards the augmented DHCP request 1175 to the DHCP server 1170. The options incorporated within the request 1175 are used to convey information to the DHCP server 1170 as to the identity of the host 1132. Because the transparent virtual router 1120 adds these options, the subscriber's identity can be trusted by the DHCP server 1170; that is, addition of these options precludes the host 1132 from masquerading as another subscriber or host and fraudulently obtaining an IP address.

The subscriber identity information contained within the augmented DHCP request 1175 assists the DHCP server 1170 in applying configured policies against the host 1132. Such policies are intended to, for example, ensure (1) that the host 1132 is not requesting more than its allowed number of IP addresses; and (2) assignment of an appropriate IP address. The DHCP server 1170 sends a DHCP reply 1176 back to the transparent virtual router 1120, which inspects or "snoops" it to ascertain which IP address has been assigned and the duration of such assignment (i.e., the lease duration). The transparent virtual router 1120 then configures this information into the routing table for the applicable TVR group and forwards the DHCP reply 1176 back to the requesting host 1132 or CPE 1130. Specifically, the transparent virtual router 1120 will typically be operative to remember the source Ethernet MAC address within the DHCP request 1174 and the mapping of the subscriber's virtual interface of the applicable TVR group through which the request 1174 was received. When the transparent virtual router 1120 receives the DHCP reply 1176, it matches the destination Ethernet MAC address therein to this subscriber virtual interface. An entry is then added to the route table for the applicable TVR group with the available information from the response 1176.

RADIUS with IPCP

Figure 12A:
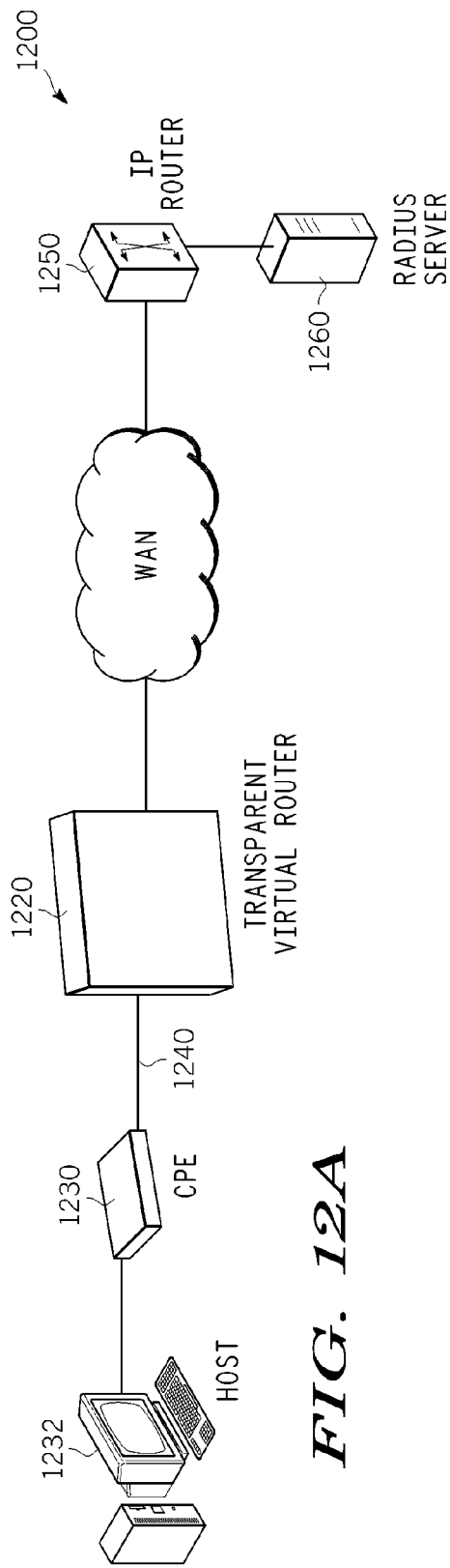
FIG. 12 provides a simplified representation of an access network and associated signal flow diagram to which reference is made in describing the manner in which IP address autoconfiguration within a TVR group may be performed using the Remote Authentication Dial In User Service (RADIUS) protocol in conjunction with the Internet Protocol Control Protocol (IPCP).
Figure 12B:
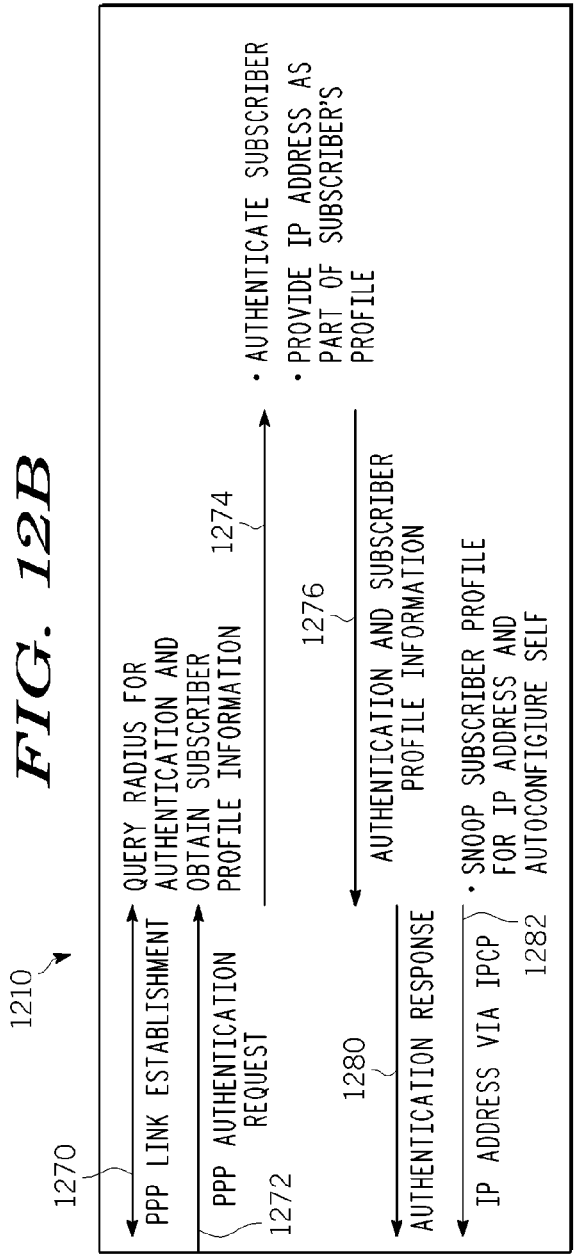

FIGS. 12A and 12B respectively illustrate a simplified access network 1200 and associated signal flow diagram 1210 to which reference will be made in describing the manner in which IP address autoconfiguration within a TVR group may be performed using the Remote Authentication Dial In User Service (RADIUS) protocol in conjunction with the Internet Protocol Control Protocol (IPCP). IPCP is defined in RFC 1332 and is used when PPP is used as a subscriber's method of access. As shown in FIG. 12A, the access network 1200 includes a transparent virtual router 1220 in operative communication with the CPE 1230 and host 1232 of each subscriber over an xDSL link 1240 terminated at a DSLAM (not shown) between the transparent virtual router 1220 and the CPE 1230. In the embodiment of FIG. 12A, the point-to-point protocol (PPP) is used as an access method from the CPE 1230 or the host 1232 and is terminated on the transparent virtual router 1220. The access network 1200 further includes a wide area network 1250 (e.g., an ATM network) having a connection to a RADIUS server 1260. As is discussed below, the RADIUS server 1260 implements the known RADIUS protocol for remote authentication of the network layer and is involved in assignment of subscriber IP addresses.

Referring to FIG. 12B, the RADIUS-based autoconfiguration process begins upon the host 1232 or CPE 1230 of a subscriber initiating a PPP session with the transparent virtual router 1220 using either PPP over ATM (PPPoA) or PPP over Ethernet (PPPoE). The transparent virtual router 1220 serves as a terminating point for the PPP session and thereby facilitates establishment of the PPP link (step 1270). In response to a PPP Authorization Request 1272 from the host 1232 or CPE 1230, the transparent virtual router 1220 begins the process of authentication by communicating with the RADIUS server 1260 (step 1274). In response, the RADIUS server 1260 authenticates the requesting subscriber and forwards an IP address and profile information for the requesting subscriber (step 1276). The transparent virtual router 1220 then sends an appropriate Authentication Response to the host 1232 or CPE 1230 of the requesting subscriber (step 1280). In addition, the transparent virtual router 1220 then stores the IP address from the RADIUS server 1260 within its routing table for the applicable TVR group, and sends it to the host 1232 or CPE 1230 via IPCP (step 1282) for use by the host 1232 or CPE 1230 for the duration of the PPP session. As may be apparent from FIG. 12, the use of transparent virtual routing in accordance with the invention advantageously permits the RADIUS server 1260 to be unconcerned with the boundaries of central office facilities when selecting an IP address to be sent to a subscriber, since the range of IP addresses utilized by the RADIUS server can be from a large IP subnet that spans multiple central office facilities, in accordance with the previously-described methods.

In certain embodiments of the invention it may be desired to configure IP subnets as well as host routes within the routing table for each TVR group. This provides a convenient way to add, delete and administer many IP addresses for a particular subscriber location. For example, instead of adding 256 host routes to such a routing table, it would be possible to instead add a single /24 subnet. Subnets may be added in this manner by statically configuring the routing table or by using RADIUS with IPCP. Addition of IP subnets to the routing table of a TVR group in this manner may be viewed as simply configuring a power-of-2 range of host IP addresses. That is, configuration of the routing table with IP subnets simply provides a shorthand approach to instead adding a list of IP addresses within such subnet to the routing table. Packet forwarding in the upstream and downstream directions is effected in the same way as if the applicable routing table contained only host IP routes.

ARP

Figure 13A:
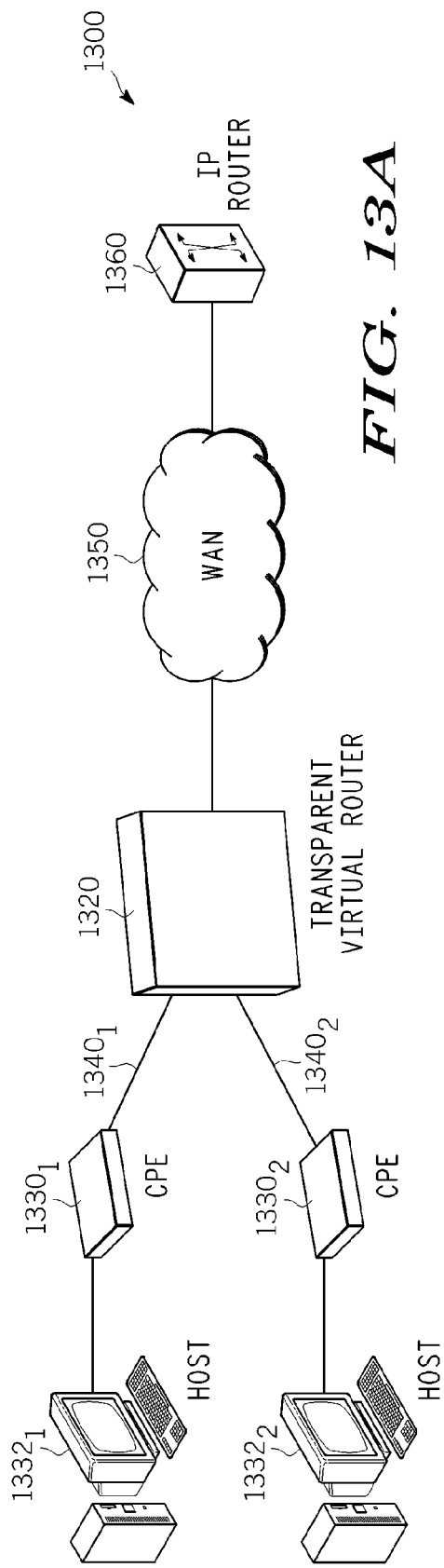
FIG. 13 provides a simplified representation of an access network and associated signal flow diagram to which reference is made in describing the manner in which IP address autoconfiguration within a TVR group may be performed using the Address Resolution Protocol (ARP).
Figure 13B:
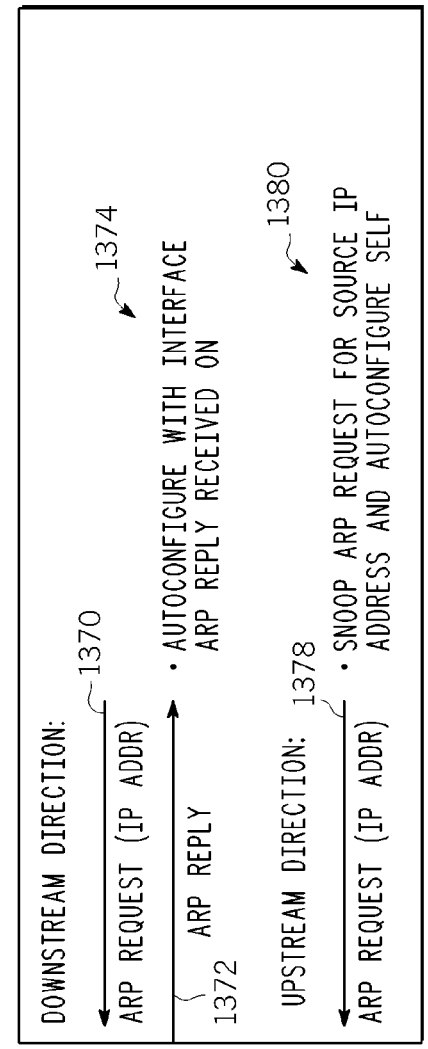

FIGS. 13A and 13B respectively illustrate a simplified access network 1300 and associated signal flow diagram 1310 to which reference will be made in describing the manner in which IP address autoconfiguration within a TVR group may be performed using the Address Resolution Protocol (ARP). As shown, the access network 1300 includes a transparent virtual router 1320 in operative communication with the CPE 1330 and host 1332 of each subscriber over an xDSL link 1340 terminated at a DSLAM (not shown) between the transparent virtual router 1320 and the CPE 1330. The access network 1300 further includes a wide area network 1350 (e.g., an ATM network) having a connection to an IP router 1360.

ARP is defined in RFC 826, and is a method used to determine to which of a group of networked hosts a given IP address belongs. The ARP method is premised on the assumption that the host of interest has already been assigned an IP address by some means. As is indicated by the signal flow diagram 1310 of FIG. 13B, this method may be employed with respect to either downstream ARP messages received by the transparent virtual router 1320 from the WAN 1350 or upstream ARP messages originating at a host 1332.

In the "downstream" method, the transparent virtual router 1320 receives an IP packet from the WAN 1350 that is destined for a host 1332 within a given TVR group. Not knowing with which host 1332 the received IP address is associated, the transparent virtual router 1320 sends an ARP Request down each subscriber virtual interface of the TVR group inquiring as to whether any host 1332 owns the received IP address (step 1370). The host 1332 having the matching IP address sends an ARP Reply to the transparent virtual router 1320 (step 1372). In response, the transparent virtual router 1320 autoconfigures the routing table of the applicable TVR group by associating the received IP address with the TVR group's virtual interface through which the ARP Reply was received.

Considering now the "upstream" method of ARP-based autoconfiguration, the transparent virtual router 1320 receives an initial ARP Request originating from a host 1332 which has been previously assigned an IP address (step 1378). The transparent virtual router 1320 snoops the received ARP Request for the previously assigned IP address and autoconfigures itself (step 1380). That is, the transparent virtual router 1320 configures the routing table for the applicable TVR group to create an association between this assigned IP address and the TVR group's virtual interface through which the ARP Request was received.

Quality of Service

The inventive transparent virtual router is compatible with and leverages existing layer 2, layer 3, and higher-layer quality-of-service (QoS) mechanisms such as the ATM Forum's Traffic Management 4.1 specification, the IEEE's 802.1p/Q Ethernet specifications, and the IETF's DiffServ specifications. In particular, the implementation of such QoS mechanisms is facilitated by the ability of the transparent virtual router to classify each received IP packet through examination of the information within its header. Included within this header information are source and destination IP address, protocol (e.g. TCP, UDP), source and destination port for the protocol, and the DiffServ codepoint field. Based on this classification, packets can be given appropriate prioritization, metering, redirection and scheduling treatment either upstream toward the network or downstream towards the subscriber. Accordingly, individual IP traffic flows can be given differential QoS within a single virtual circuit.

Figure 14:
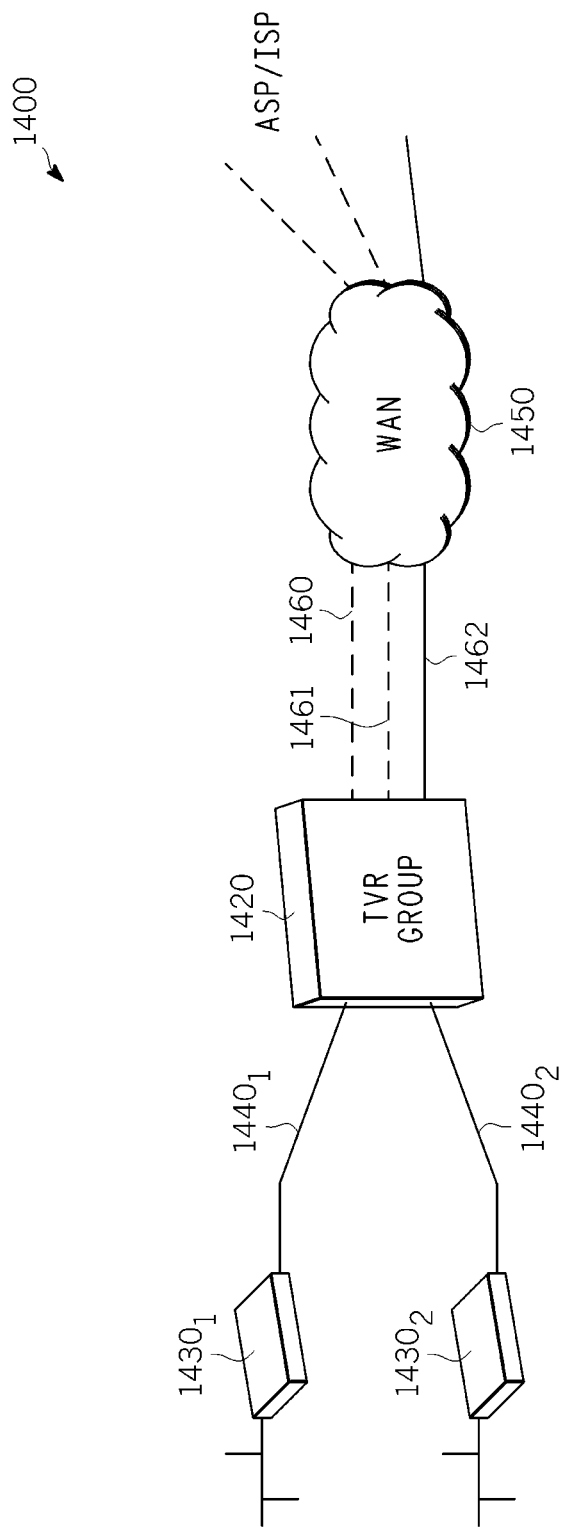
FIG. 14 shows a simplified representation of an access network to which reference is made in describing the manner in which upstream-directed packets may redirected in a desired manner through the use of IP policies.

Turning now to FIG. 14, there is shown a simplified representation of an access network 1400 to which reference will be made in describing the manner in which upstream-directed packets may be redirected in a desired manner through the use of IP policies. This permits, for example, higher-priority and lower-priority IP traffic flows to be redirected to different virtual circuits of appropriate QoS for transmission through the wide area network. IP policies may also be configured to block packets either to prevent certain undesired traffic from entering the network or to provide improved security.

As shown in FIG. 14, the access network 1400 includes a transparent virtual router 1420 in operative communication with subscriber interfaces 1430 over xDSL links 1440 terminated at a DSLAM (not shown) between the transparent virtual router 1420 and the subscriber interfaces 1430. The access network 1400 further includes a wide area network 1450 (e.g., an ATM network) having a connection to one or more external IP-based networks (e.g., the Internet). To make a new service potentially available to a large number of subscribers, a NAP need only provision a new virtual circuit from the ISP or ASP (Application Service Provider) across the WAN 1450 to the transparent virtual router 1420 and incorporate therein an IP policy to redirect the appropriate traffic to this new virtual circuit. The new virtual circuit will contain subscriber traffic from all the subscribers directed by the IP policy into that virtual circuit, and can be provisioned with appropriate QoS parameters (e.g. peak and average bandwidth, prioritization, jitter, delay and burst characteristics) to deliver that service to those subscribers.

For example, in the embodiment of FIG. 14 a set of three virtual circuits 1460-1462 in communication with the transparent virtual router 1420 are seen to have been established across the WAN 1450. Specifically, a first virtual circuit 1460 characterized by relatively favorable QoS parameters is configured to carry high priority traffic (e.g., associated with a media player application) while a second virtual circuit 1461 characterized by minimal QoS parameters carries low priority traffic (e.g., PC backup data). In the exemplary embodiment of FIG. 14 all other traffic is carried by a third virtual circuit 1462 characterized by QoS parameters somewhat less favorable than those associated with the first virtual circuit 1460.

The transparent virtual router 1420 may also be configured to implement policies to regulate traffic destined for particular subscriber interfaces 1430. For example, policies may be implemented to prohibit particular types of traffic (e.g., traffic associated with a gaming application) from passing through certain subscriber-side ports of the transparent virtual router 1420 (e.g., UDP port "M").

It may thus be appreciated that the transparent virtual routing technique of the present invention simplifies the implementation of QoS mechanisms within an access network, as it substantially reduces the number of virtual circuits required to be provided in the access network relative to architectures relying upon "end-to-end" virtual circuit connections, with separate virtual circuits for each service utilized by each subscriber. As a consequence, fewer virtual circuits require ATM-based traffic parameter management. Moreover, improved bandwidth utilization is possible due to the statistical multiplexing which occurs incident to aggregation.

Services and Applications Using Transparent Virtual Routing

The transparent virtual routing (TVR) technique of the present invention may be used to facilitate the provisioning of a variety of applications and services. Certain of these applications and services are described below, while many others are possible.

Wholesale IP Access

With wholesale IP access, a NAP provides several ISPs with access to subscribers. Consistent with the TVR techniques of the invention, a NAP could configure a single TVR group for each ISP and thereby aggregate the traffic of the subscribers of the ISP serviced by one or more central office facilities. This aggregated traffic could then be directed into a single virtual circuit from the TVR group to such ISP. As mentioned above, if the ISP offers more than one service it is possible to provide several virtual circuits between the TVR group and the ISP. Each virtual circuit would offer QoS appropriate for the type of service being offered. Advantageously, the TVR groups for each ISP are fully secure from each other and may use whatever IP addressing scheme is desired by the ISP. In addition, the necessity for IP addressing coordination between the ISP and NAP is virtually eliminated. Finally, it is possible to configure the TVR group to prevent, or allow, direct forwarding of IP traffic between subscribers within a TVR group.

Multicast Video

TVR supports multicast applications such as multicast video. In this case the inventive transparent virtual router tracks which subscribers have joined a particular multicast session and replicates the IP multicast stream to these subscribers. By replicating multicast streams within the access network instead of at an "upstream" regional metropolitan location, the NAP saves significant additional investment in access network equipment and transport circuits.

IP Virtual Private Networks

TVR supports both CPE-based and network-based IP virtual private network (VPN) architectures. With CPE-based IP VPNs, the CPE performs such functions as encryption and firewalling. A TVR group may be configured in a transparent virtual router for each VPN; all subscribers who are members of that VPN will have their virtual interfaces within this TVR group. The traffic of that VPN is then aggregated and forwarded into its own private IP network. To this end this aggregated traffic may be mapped onto a separate virtual circuit so as to segregate such traffic in the upstream network from other traffic processed by the transparent virtual router to the extent desired.

For network-based IP VPNs, another device such as an IP Services Switch (IPSS) may be deployed to perform the encryption and firewalling functions. In this case the role of the transparent virtual router is to aggregate and groom the traffic in the access network destined for the IPSS. Because the IPSS need not be configured to perform a virtual circuit aggregation function (which would potentially be necessary in the case of "end-to-end" virtual circuit architectures), it may instead devote the bulk of its resources to provision of various advanced IP-based services.

Voice Over IP

TVR may also be employed to efficiently support peer-to-peer applications, such as voice-over-IP (VoIP). Similar to applications supporting wholesale IP access, a separate TVR group may be configured in a given transparent virtual router for each VoIP provider. Subscriber-originated calls that are destined to another subscriber served by that transparent virtual router may be forwarded to such subscriber directly, since VoIP calls are encapsulated within IP packets that the transparent virtual router is capable of routing from one subscriber to another. This means that localized VoIP calls do not have to be forwarded into the upstream network and then returned to the router. In this sense the transparent virtual router effectively provides benefits similar to those afforded by use of a Class 5 switch within the common Public Switched Telephone Network (PSTN); namely, that local calls "stay local" instead of being forwarded to a Class 4 tandem switch and routed back to the originating Class 5 switch.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for generating an IP-based routing table for use by a transparent routing device disposed within an access network configured in accordance with one or more lower-layer protocols, wherein the transparent routing device comprises a plurality of subscriber-side ports and at least one network-side port, and wherein the transparent routing device is configured to route both upstream and downstream network traffic, said method comprising:
   receiving a message through a virtual subscriber-side interface that is defined by said transparent routing device and associated with one of the plurality of subscriber-side ports, the message comprising a request; and
   creating an association within the IP-based routing table between an IP address associated with the message, and said virtual subscriber-side interface;
   wherein the IP-based routing table is associated with a transparent virtual routing group of the transparent routing device; and
   wherein the transparent routing device is able to automatically configure the IP-based routing table by determining IP addresses of a plurality of subscriber hosts associated with the transparent virtual routing group.

2. The method of claim 1, said method further comprising:
   wherein the message comprises an address resolution request destined for an IP-based network from a subscriber host within said access network;
   inspecting said address resolution request so as to identify an IP address of said subscriber host included within said address resolution request; and
   wherein the step of creating an association comprises creating the association within the IP-based routing table between said IP address and said virtual subscriber-side interface.

3. The method of claim 2 wherein said IP-based routing table is associated with a first set of virtual subscriber-side interfaces of said transparent routing device, said method further including generating an additional IP-based routing table associated with a second set of virtual subscriber-side interfaces of said transparent routing device.

4. The method of claim 1, wherein the step of receiving a message comprises receiving the message from a subscriber host served by said access network and through the virtual subscriber-side interface defined by said transparent routing device, the message comprising a DHCP request destined for a DHCP server;
   said method further comprising:
   generating an augmented DHCP request including at least a client identifier associated with said subscriber host;
   forwarding the DHCP request to the DHCP server;
   receiving, from the DHCP server, a DHCP reply; and
   inspecting said DHCP reply so as to identify an IP address which has been assigned to said subscriber host;
   wherein the step of creating an association comprises creating the association within the IP-based routing table between said IP address and said virtual subscriber-side interface.

5. The method of claim 4 further including forwarding the DHCP reply to said subscriber host through said virtual subscriber-side interface.

6. The method of claim 4 wherein said augmented DHCP request further includes relay agent information.

7. The method of claim 4 further including inspecting said DHCP reply so as to determine a duration of assignment of said IP address to said subscriber host.

8. The method of claim 4 wherein said IP-based routing table is associated with a first set of virtual subscriber-side interfaces of said transparent routing device, said method further including generating an additional IP-based routing table associated with a second set of virtual subscriber-side interfaces of said transparent routing device.

9. A method for generating an IP-based routing table for use by a transparent routing device disposed within an access network configured in accordance with one or more lower-layer protocols, wherein the transparent routing device comprises a plurality of subscriber-side ports and a network-side port, and is configured to route both upstream and downstream network traffic, and wherein the IP-based routing table is associated with a transparent virtual routing group of the transparent routing device, said method comprising:
   receiving a message through a network-side interface that is defined by said transparent routing device and associated with the network-side port, the message comprising an IP packet received from an IP-based network and destined for a subscriber host within said access network;
   identifying a destination IP address of said IP packet; and
   if no association exists within the IP-based routing table between the destination IP address and a virtual subscriber-side interface defined by said transparent routing device:
   generating a request for identifying the subscriber host having the destination IP address;
   transmitting the request to a plurality of hosts via a plurality of virtual subscriber-side interfaces of said transparent routing device;
   receiving a reply, via one of the plurality of virtual subscriber-side interfaces, from the subscriber host having the destination IP address; and
   creating an association within the IP-based routing table between the destination IP address and the one of the plurality of virtual subscriber-side interfaces.

* * * * *